(12) United States Patent
Takizawa

(10) Patent No.: US 8,760,703 B2
(45) Date of Patent: Jun. 24, 2014

(54) JOB CONTROL SYSTEM AND JOB CONTROL METHOD

(71) Applicant: Kazuyuki Takizawa, Saitama (JP)

(72) Inventor: Kazuyuki Takizawa, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 34 days.

(21) Appl. No.: 13/706,525

(22) Filed: Dec. 6, 2012

(65) Prior Publication Data
US 2013/0148159 A1    Jun. 13, 2013

(30) Foreign Application Priority Data
Dec. 13, 2011    (JP) .................................. 2011-272416

(51) Int. Cl.
*G06F 15/00* (2006.01)
*G06F 3/12* (2006.01)
*G06K 1/00* (2006.01)

(52) U.S. Cl.
USPC .......................................... 358/1.15; 358/1.1

(58) Field of Classification Search
USPC ................. 358/1.1, 1.15, 1.13, 1.14
See application file for complete search history.

(56) References Cited

U.S. PATENT DOCUMENTS

| 2001/0029531 | A1 | 10/2001 | Ohta | |
|---|---|---|---|---|
| 2011/0310426 | A1* | 12/2011 | Kujirai et al. | 358/1.14 |
| 2012/0110066 | A1* | 5/2012 | Furuta et al. | 709/203 |

FOREIGN PATENT DOCUMENTS

| JP | 2001-325182 | 11/2001 |
|---|---|---|
| JP | 3573466 | 10/2004 |
| WO | WO 97/36226 | 10/1997 |

* cited by examiner

*Primary Examiner* — Douglas Tran
(74) *Attorney, Agent, or Firm* — IPUSA, PLLC

(57) ABSTRACT

A system includes electronic apparatuses, an information terminal, and an information processing apparatus connected via a data communication line to the electronic apparatuses and the information terminal. The information processing apparatus includes a job executing apparatus determining unit configured to perform a determination process based on apparatus information received from the electronic apparatuses to determine one of the electronic apparatuses as an executing electronic apparatus for executing a requested job, and a data conversion unit configured to convert requested job data received from the information terminal into converted data that the executing electronic apparatus can process and transmit the converted data to the executing electronic apparatus to request execution of the requested job.

16 Claims, 15 Drawing Sheets

[CONDITION SETTING]

| CONDITION SETTING | (PRIORITY ON PRINTING SPEED) |
|---|---|

[TRANSMISSION ITEM SETTING]

| CONDITION | TRANSMISSION INFORMATION ITEM |
|---|---|
| PRIORITY ON PRINTING SPEED | (NUMBER OF ACTIVE PRINT JOBS, MODEL) |
| PRIORITY ON PRINTING COST | (DUPLEX PRINTING SUPPORT, TRAY SETTING) |
| PRIORITY ON TONER AMOUNT | (AMOUNT OF REMAINING TONER) |

| JOB IDENTIFICATION | CONDITION |
|---|---|
| J001 | (PRIORITY ON PRINTING SPEED) |
| J002 | (PRIORITY ON PRINTING COST) |
| J003 | (PRIORITY ON PRINTING SPEED) |
| .... | .... |

80D

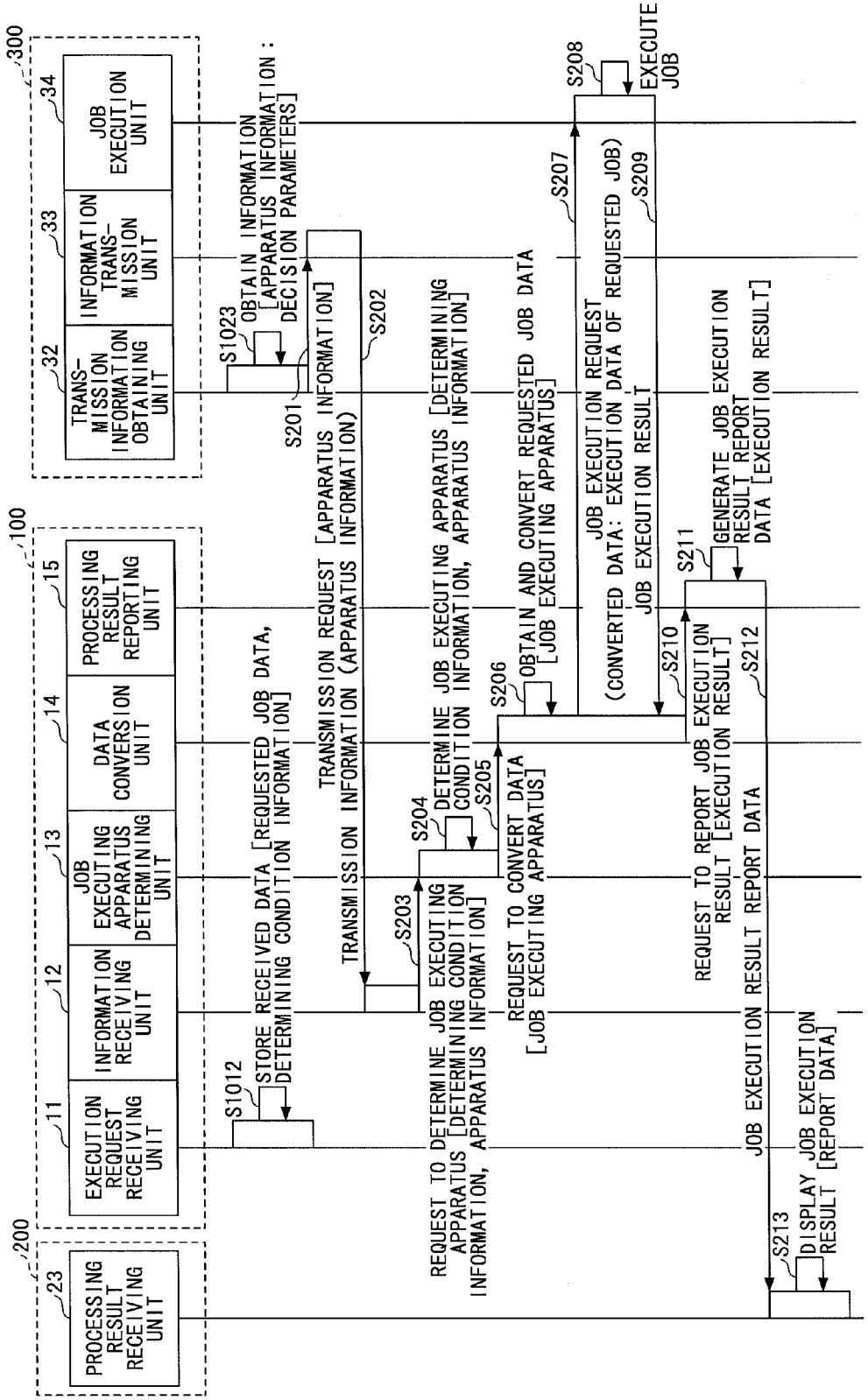

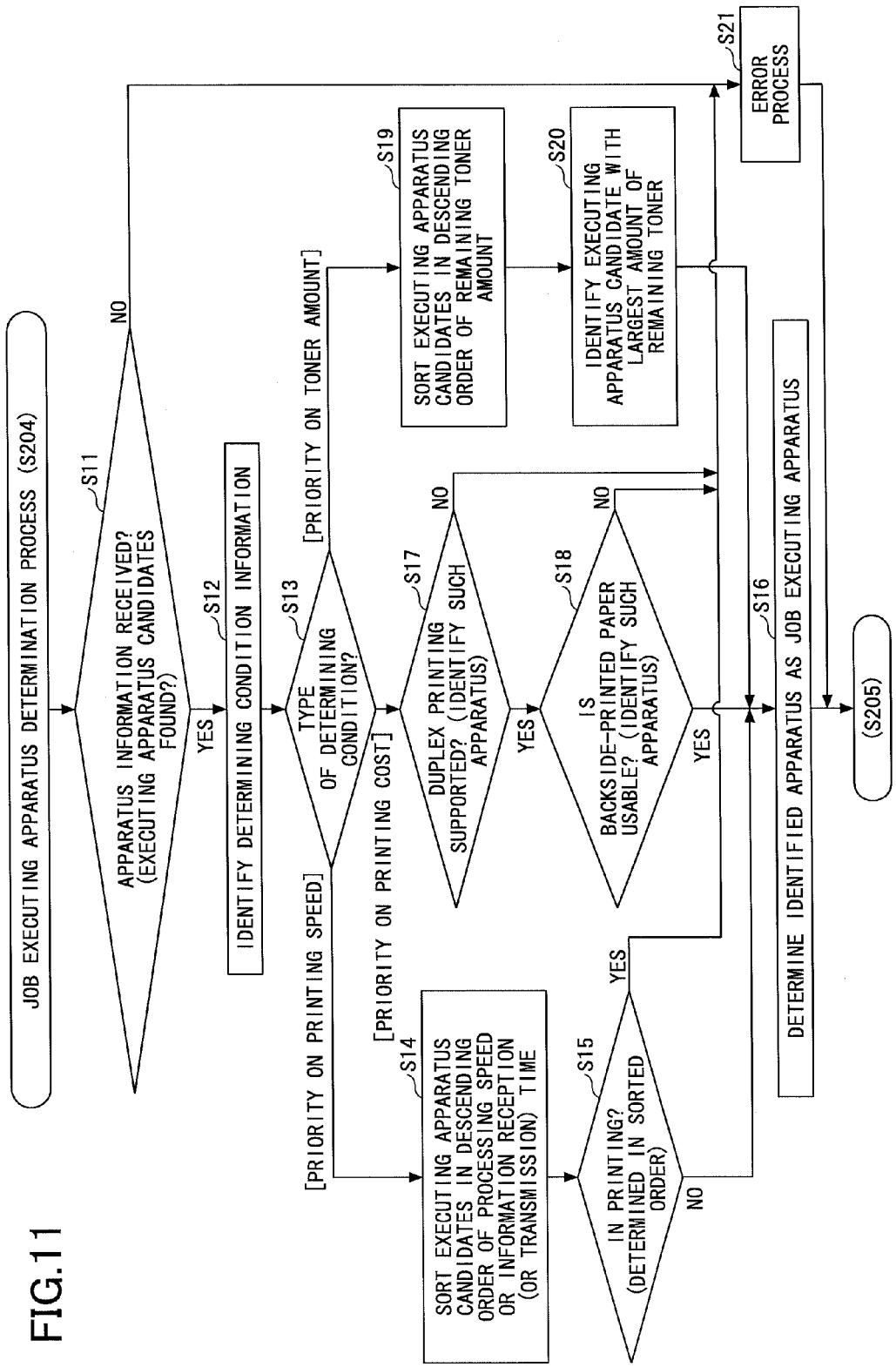

[CONDITION SETTING]

| CONDITION SETTING | (1. PRIORITY ON PRINTING COST, 2. PRIORITY ON PRINTING SPEED, 3. PRIORITY ON TONER AMOUNT) |
|---|---|

[TRANSMISSION ITEM SETTING]

| CONDITION | TRANSMISSION INFORMATION ITEM |
|---|---|
| PRIORITY ON PRINTING SPEED | (NUMBER OF ACTIVE PRINT JOBS, MODEL) |
| PRIORITY ON PRINTING COST | (DUPLEX PRINTING SUPPORT, TRAY SETTING) |
| PRIORITY ON TONER AMOUNT | (AMOUNT OF REMAINING TONER) |

FIG.13

| JOB IDENTIFICATION | CONDITION |
|---|---|
| J001 | (1. PRIORITY ON PRINTING COST, 2. PRIORITY ON PRINTING SPEED, 3. PRIORITY ON TONER AMOUNT) |
| J002 | (1. PRIORITY ON PRINTING SPEED, 2. PRIORITY ON PRINTING COST, 3. PRIORITY ON TONER AMOUNT) |
| J003 | (1. PRIORITY ON PRINTING COST, 2. PRIORITY ON PRINTING SPEED, 3. PRIORITY ON TONER AMOUNT) |
| ... | ... |

80D

JOB CONTROL SYSTEM AND JOB CONTROL METHOD

CROSS-REFERENCE TO RELATED APPLICATION

The present application is based upon and claims the benefit of priority of Japanese Patent Application No. 2011-272416, filed on Dec. 13, 2011, the entire contents of which are incorporated herein by reference.

BACKGROUND OF THE INVENTION

1. Field of the Invention

An aspect of this disclosure relates to a technology for controlling execution of jobs.

2. Description of the Related Art

Japanese Patent No. 3573466, for example, discloses a job control technology where a client sends job data of a print job to a server, and the server generates print data and sends the print data to an image processing apparatus to execute the print job. The disclosed technology eliminates the need to include software (e.g., a printer driver) for generating print data in a client and thereby makes it possible to simplify software management and save storage resources.

However, with the related-art job control technology, the user needs to specify an apparatus or device where a job is to be executed. Here, for example, the format of print data (or execution data) of a print job varies depending on an "executing" image processing apparatus where the print job is to be executed. Accordingly, the server needs to generate execution data that the executing image processing apparatus can process. For this reason, the client sends information indicating an executing image processing apparatus specified by the user to the server, and the server identifies the executing image processing apparatus based on the information and generates data that the executing image processing apparatus can process.

Thus, with the related-art job control technology, the user needs to take the trouble of specifying an "executing" apparatus or device each time that the user requests execution of a job. To obviate this problem, it may be possible to use a fixed or predetermined image processing apparatus to execute jobs. In this case, however, since the same image processing apparatus is used for all jobs requested by the user, the jobs may not be processed properly.

For the above reasons, it is preferable to dynamically and automatically determine an executing apparatus or device that is suitable to execute a requested job.

SUMMARY OF THE INVENTION

In an aspect of this disclosure, there is provided a system including electronic apparatuses, an information terminal, and an information processing apparatus connected via a data communication line to the electronic apparatuses and the information terminal. The information terminal includes a job execution requesting unit configured to transmit requested job data of a requested job to the information processing apparatus to request execution of the requested job, and an information transmission requesting unit configured to request the electronic apparatuses to transmit apparatus information to the information processing apparatus. The information processing apparatus includes a job executing apparatus determining unit configured to perform a determination process based on the apparatus information received from the electronic apparatuses to determine one of the electronic apparatuses as an executing electronic apparatus for executing the requested job, and a data conversion unit configured to convert the requested job data received from the information terminal into converted data that the executing electronic apparatus can process and transmit the converted data to the executing electronic apparatus to request execution of the requested job. Each of the electronic apparatuses includes an information transmission unit configured to transmit the apparatus information, to the information processing apparatus when requested by the information terminal, and a job execution unit configured to process the converted data received from the information processing apparatus and thereby execute the requested job when requested by the information processing apparatus.

BRIEF DESCRIPTION OF THE DRAWINGS

FIG. 6 is a drawing illustrating exemplary configuration information according to the first embodiment;

FIG. 10 is a sequence chart illustrating a part (2) of the exemplary job control process according to the first embodiment;

FIG. 11 is a flowchart illustrating an exemplary job executing apparatus determining process according to the first embodiment;

FIG. 12 is a drawing illustrating exemplary configuration information according to a second embodiment;

FIG. 13 is a table illustrating an example of determining condition management information according to the second embodiment;

DESCRIPTION OF THE PREFERRED EMBODIMENTS

Preferred embodiments of the present invention are described below with reference to the accompanying drawings.

First Embodiment

<System Configuration>

Figure 1:
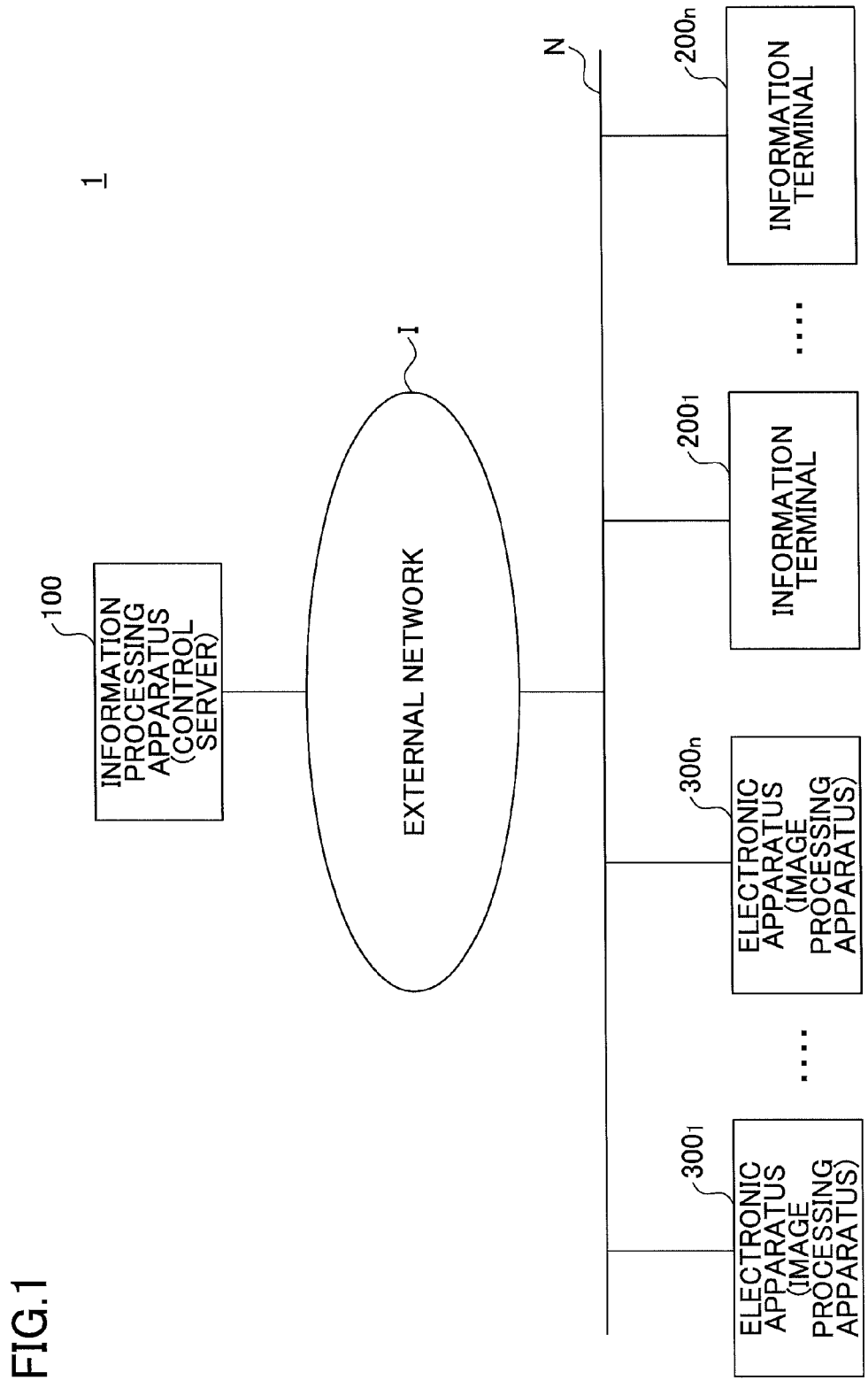
FIG. 1 is a drawing illustrating an exemplary configuration of a job control system according to a first embodiment.

FIG. 1 is a drawing illustrating an exemplary configuration of a job control system 1 according to a first embodiment.

As illustrated in FIG. 1, the job control system 1 includes one or more information terminals $200_1$-$200_n$ (which may be collectively referred to as the information terminal(s) 200) and one or more electronic apparatuses $300_1$-$300_n$ (which may be collectively referred to as the electronic apparatus(es) 300) that are connected via an internal network N (e.g., a local area network (LAN)). The job control system 1 further includes an information processing apparatus 100 connected to an external network I (e.g., the Internet or a public network) that is connected via a firewall to the internal network N. The internal network N is, for example, a private network area set up in a company. Meanwhile, the external network I is a public network area.

In the job control system 1 with a network configuration as described above, apparatuses (the information terminals 200 and the electronic apparatuses 300) connected to the internal network N can access, via the firewall, the information processing apparatus 100 connected to the external network I while maintaining the security in the private network area.

The electronic apparatus 300 may be an image processing apparatus such as a printer, a multifunction peripheral (MFP), or a projector that includes image processing functions. The electronic apparatus 300 processes execution data of a received job according to specified execution conditions.

The information terminal 200 may be, for example, a personal computer (PC) that includes information processing functions. The information terminal 200 transmits data of a requested job (which may be referred to as "requested job data") to the information processing apparatus 100 to request execution of the job and receives the result of executing the job from the information processing apparatus 100. The information terminal 200 is not limited to a PC, but may instead be a smartphone or a tablet PC. The information terminal 200 may also be an apparatus such as a digital camera that captures, stores, and manages image data. Any apparatus connectable to the internal network N and capable of transmitting a job execution request and receiving a job execution result may be used as the information terminal 200.

The information processing apparatus 100 may be a control server that includes information processing functions. The information processing apparatus 100 controls execution of jobs by the electronic apparatuses 300 according to job execution requests received from the information terminals 200. More specifically, the information processing apparatus 100 converts requested job data received from one of the information terminals 200 into execution data that an executing electronic apparatus 300 (one of the electronic apparatuses 300 where the job is to be executed) can process, and transmits the execution data to the executing electronic apparatus 300.

With the above configuration, the job control system 1 of the present embodiment provides a print job control service as described below. Job control methods may be classified into a "pull-type" and a "push-type". In a pull-type job control method, a print job is transmitted from the information terminal 200 to the information processing apparatus 100, and the electronic apparatus 300 obtains execution data of the print job from the information processing apparatus 100 according to an execution request entered by the user and processes the obtained execution data to execute the print job. In a push-type job control method, a print job is transmitted from the information terminal 200 to the information processing apparatus 100, the information processing apparatus 100 transmits execution data of the print job to the electronic apparatus 300, and the electronic apparatus 300 processes the execution data to execute the print job.

Below, it is assumed that a push-type print job control method is employed in the job control system 1 of the present embodiment.

First, the information terminal 200 receives, via an interface, user inputs related to job control. For example, the information terminal 200 receives print job data (e.g., application data to be printed) to be transmitted to the information processing apparatus 100 to request execution of a print job and an apparatus information setting (e.g., a transmission information setting) to be transmitted to the electronic apparatuses 300 to request transmission of apparatus information.

When an execution request is entered by the user, the information terminal 200 transmits the print job data to the information processing apparatus 100 to request execution of the print job, and also requests the electronic apparatuses 300 to transmit apparatus information to the information processing apparatus 100. When receiving the request from the information terminal 200, the electronic apparatuses 300 transmit their apparatus information to the information processing apparatus 100.

The information processing apparatus 100 performs a determination process based on the apparatus information received from the electronic apparatuses 300 to determine an executing electronic apparatus 300 suitable to execute (or process) the print job (the executing electronic apparatus 300 may also be referred to as a "printing electronic apparatus 300"). When the executing electronic apparatus 300 is determined, the information processing apparatus 100 converts the print job data received from the information terminal 200 into data (print data) that the executing electronic apparatus 300 can process (i.e., generates execution data of the print job). The information processing apparatus 100 transmits the converted data to the executing electronic apparatus 300 via a communication connection established between the executing electronic apparatus 300 and the information processing apparatus 100 for transmission and reception of the apparatus information, and thereby requests the executing electronic apparatus 300 to execute the print job. Then, the executing electronic apparatus 300 properly executes the print job requested by the user.

Thus, the job control system 1 of the present embodiment can provide a job control service as described above and makes it possible to dynamically determine an executing apparatus suitable to execute a requested job and execute the job at the determined executing apparatus.

<Hardware Configuration>
<Information Processing Apparatus>

Figure 2:
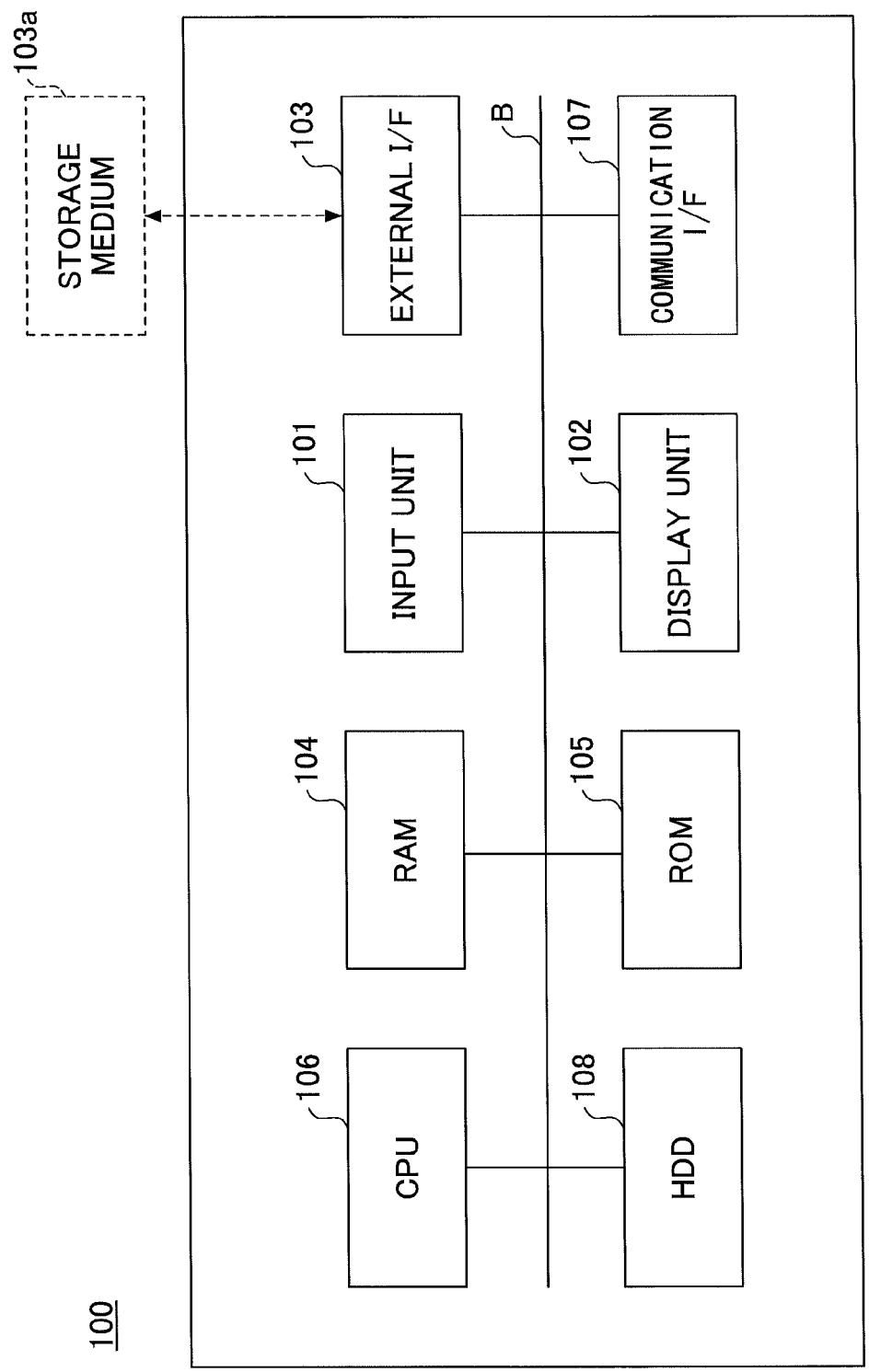
FIG. 2 is a block diagram illustrating an exemplary hardware configuration of an information processing apparatus according to the first embodiment.

FIG. 2 is a block diagram illustrating an exemplary hardware configuration of the information processing apparatus 100 according to the present embodiment.

As illustrated in FIG. 2, the information processing apparatus 100 may include an input unit 101, a display unit 102, an external I/F 103, a random access memory (RAM) 104, a read-only memory (ROM) 105, a central processing unit (CPU) 106, a communication I/F 107, and a hard disk drive (HDD) 108 that are connected to each other via a bus B.

The input unit 101 includes, for example, a keyboard and a mouse, and is used to input instructions (or operation signals) to the information processing apparatus 100. The display unit 102 displays, for example, processing results of the information processing apparatus 100.

The communication I/F 107 is an interface for connecting the information processing apparatus 100 to a network (e.g., the external network I). The information processing apparatus 100 can perform data communications with other apparatuses (e.g., the information terminals 200 and the electronic apparatuses 300) via the network I/F 107.

The HDD 108 is a non-volatile storage device for storing various programs and data. For example, the HDD 108 stores basic software or an operating system (OS) for controlling the entire information processing apparatus 100, and applications for providing various functions on the OS. The HDD 108 may manage the stored programs and data using a file system and/or a database (DB).

The external I/F 103 is an interface between the information processing apparatus 100 and an external device such as a storage medium 103a. The information processing apparatus 100 can read and write data from and to the storage medium 103a via the external I/F 103. Examples of the storage medium 103a include a floppy (flexible) disk (FD), a compact disk (CD), a digital versatile disk (DVD), a secure digital (SD) memory card, and a universal serial bus (USB) memory.

The ROM 105 is a non-volatile semiconductor memory (storage unit) that can retain data even when power is turned off. For example, the ROM 105 stores programs and data such as a basic input/output system (BIOS) that is executed when the information processing apparatus 100 is turned on, and system and network settings of the information processing apparatus 100. The RAM 104 is a volatile semiconductor memory (storage unit) for temporarily storing programs and data. The CPU 106 loads programs and data from storage units (e.g., the HDD 108 and the ROM 105) into the RAM 104 and executes the loaded programs to control the information processing apparatus 100 and to implement various functions.

With the above hardware configuration, the information processing apparatus 100 can provide various information processing services (functions) including a job control service (function).

The information terminal 200 may have a hardware configuration that is substantially the same as the hardware configuration of the information processing apparatus 100. Therefore, descriptions of the hardware configuration of the information terminal 200 are omitted here.

<Job Control Function>

A job control function according to the present embodiment is described below.

In the job control system 1 of the present embodiment, the information terminal 200 transmits requested job data of a requested job to the information processing apparatus 100 to request execution of the requested job, and also requests the electronic apparatuses 300 to transmit apparatus information to the information processing apparatus 100. When receiving the request from the information terminal 200, the electronic apparatuses 300 transmit their apparatus information to the information processing apparatus 100. The information processing apparatus 100 performs a determination process based on the apparatus information received from the electronic apparatuses 300 to determine an executing electronic apparatus 300 suitable to execute the requested job. When the executing electronic apparatus 300 is determined, the information processing apparatus 100 converts the requested job data received from the information terminal 200 into data that the executing electronic apparatus 300 can process (i.e., generates execution data of the requested job). The information processing apparatus 100 transmits the converted data to the executing electronic apparatus 300 via a communication connection established between the executing electronic apparatus 300 and the information processing apparatus 100 for transmission and reception of the apparatus information, and thereby requests the executing electronic apparatus 300 to execute the requested job. Then, the executing electronic apparatus 300 properly executes the requested job. The job control system 1 of the present embodiment provides a job control function as described above.

Meanwhile, with the related-art job control technology, the user needs to take the trouble of specifying an "executing" apparatus or device each time when requesting execution of a job.

In addition, in a communication environment including the external network I and the internal network N (i.e., a cloud environment where a server is provided in an external network), there are problems as described below. Generally, a firewall is provided between the external network I and the internal network N to maintain security. With the firewall, the information processing apparatus (control server) 100 cannot transmit execution data of a job to an executing electronic apparatus 300. When a push-type job control method is employed, this problem also needs to be solved.

For this reason, in the job control system 1 of the present embodiment, one or more electronic apparatuses 300 (which may be referred to as "executing apparatus candidates") are requested to report their apparatus information to the information processing apparatus 100, and the information processing apparatus 100 determines an executing electronic apparatus 300 that is suitable to execute a requested job based on the reported apparatus information. Also in the job control system 1 of the present embodiment, the information processing apparatus 100 transmits execution data of the job to the executing electronic apparatus 300 via a communication connection established when the apparatus information is transmitted from the executing electronic apparatus 300.

With the above configuration, the job control system 1 of the present embodiment makes it possible to dynamically determine an executing apparatus suitable to execute a requested job and to execute the requested job at the determined executing apparatus. In other words, the job control system 1 can provide a convenient and efficient job control service.

An exemplary functional configuration of the job control system 1 is described below.

Figure 3:
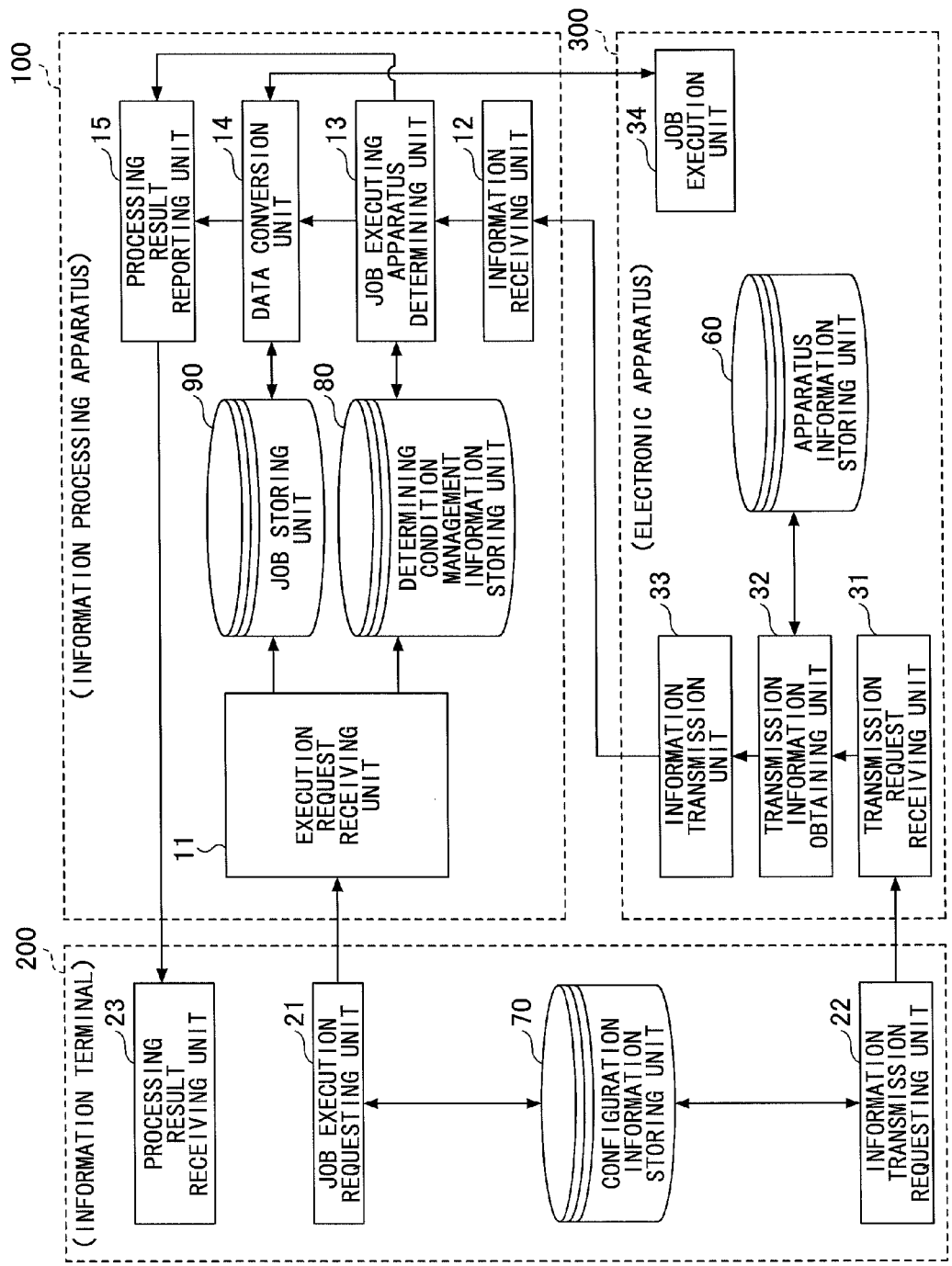
FIG. 3 is a block diagram illustrating an exemplary functional configuration of a job control system according to the first embodiment.

FIG. 3 is a block diagram illustrating an exemplary functional configuration of the job control system 1 of the present embodiment.

As illustrated in FIG. 3, the job control system 1 includes an execution request receiving unit 11, an information receiving unit 12, a job executing apparatus determining unit 13, a data conversion unit 14, a processing result reporting unit 15, a job execution requesting unit 21, an information transmission requesting unit 22, a processing result receiving unit 23, a transmission request receiving unit 31, a transmission information obtaining unit 32, an information transmission unit 33, and a job execution unit 34.

The execution request receiving unit 11, the information receiving unit 12, the job executing apparatus determining unit 13, the data conversion unit 14, and the processing result reporting unit 15 are functional units of the information processing apparatus 100. The job execution requesting unit 21, the information transmission requesting unit 22, and the processing result receiving unit 23 are functional units of the information terminal 200. The transmission request receiving unit 31, the transmission information obtaining unit 32, the information transmission unit 33, and the job execution unit 34 are functional units of the electronic apparatus 300.

The job control function of the present embodiment is provided through collaboration among the above described functional units.

<Information Terminal>

The job execution requesting unit 21 of the information terminal 200 is a functional unit that requests the information processing apparatus 100 to execute a job (i.e., transmits a job execution request to the information processing apparatus 100). The job execution requesting unit 21 receives, via an interface, information indicating requested job data of a requested job specified by the user. The job execution requesting unit 21 transmits the requested job data corresponding to the received information to the information processing apparatus 100 to request execution of the requested job. As a result, a communication connection is established between the information terminal 200 and the information processing apparatus 100.

Figure 4:
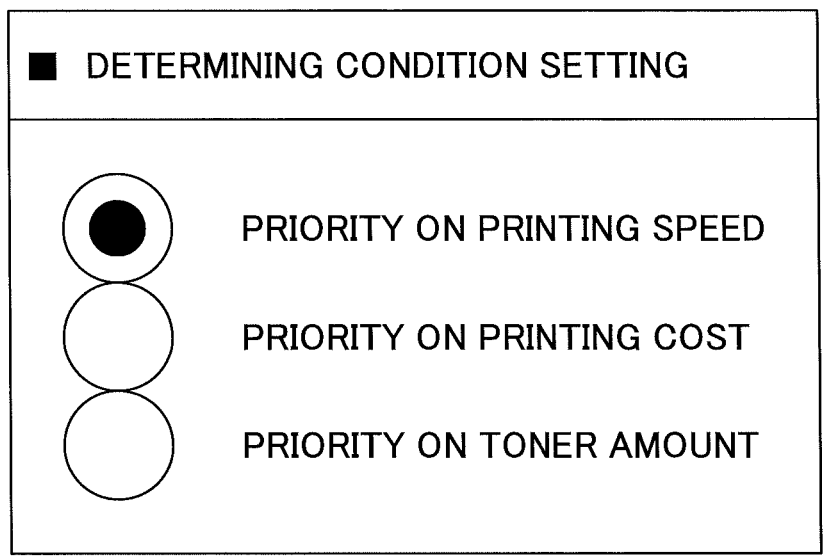
FIG. 4 is a drawing illustrating an exemplary setting screen for setting a job executing apparatus determining condition according to the first embodiment.

The information terminal 200 also displays a setting screen as illustrated in FIG. 4 (i.e., provides an interface) to allow the user to set a job executing apparatus determining condition that is used by the information processing apparatus 100 to determine an executing electronic apparatus 300 suitable to execute the requested job.

FIG. 4 is a drawing illustrating an exemplary setting screen for setting a job executing apparatus determining condition according to the present embodiment.

In the example of FIG. 4, the setting screen includes options "Priority on Printing Speed", "Priority on Printing Cost", and "Priority on Toner Amount". With "Priority on Printing Speed", one of the candidate electronic apparatuses 300 (may be referred to as "printing apparatus candidates") that can process a requested print job at the fastest speed is selected. With "Priority on Printing Cost", one of the candidate electronic apparatuses 300 that can execute a requested print job at the lowest cost is selected. With "Priority on Toner Amount", one of the candidate electronic apparatuses 300 that contains the largest amount of remaining toner among the candidate electronic apparatuses 300 capable of processing the requested print job is selected.

Referring back to FIG. 3, the job execution requesting unit 21 transmits information (which may be referred to as "job executing apparatus determining condition information" or "determining condition information") indicating a job executing apparatus determining condition selected on the setting screen together with the requested job data to the information processing apparatus 100. In the descriptions below, for brevity, the term "job executing apparatus determining condition" may be used to indicate both the condition itself and the job executing apparatus determining condition information. Here, it is not necessary to set the job executing apparatus determining condition each time when requesting execution of a job. For example, the job execution requesting unit 21 may be configured to obtain a preset job executing apparatus determining condition from a predetermined storage area of a storage unit of the information terminal 200 when requesting execution of a job, and to send the obtained job executing apparatus determining condition together with the requested job data to the information processing apparatus 100.

The information transmission requesting unit 22 of the information terminal 200 is a functional unit that requests the electronic apparatuses 300 to transmit information (i.e., transmits information transmission requests to the electronic apparatuses 300). More specifically, based on the job executing apparatus determining condition corresponding to a requested job, the information transmission requesting unit 22 requests the electronic apparatuses 300 to transmit decision parameters (apparatus information available from the electronic apparatuses 300) used in a determination process to determine an executing electronic apparatus 300.

Figure 5:
FIG. 5 is a drawing illustrating an exemplary configuration screen for configuring information transmission request settings according to the first embodiment.

Also, the information terminal 100 displays a configuration screen as illustrated in FIG. 5 (i.e., provides an interface) to allow the user to select electronic apparatuses 300 that are requested to transmit information and transmission information items that the selected electronic apparatuses 300 are requested to transmit.

FIG. 5 is a drawing illustrating an exemplary configuration screen for configuring information transmission request settings according to the present embodiment.

In the example of FIG. 5, the configuration screen includes a destination setting area for selecting destinations, i.e., electronic apparatuses 300 that are requested to transmit information, and a transmission item setting area for setting information items (decision parameters) that the selected electronic apparatuses 300 are requested to transmit.

The destination setting area includes options "Same Subnet" and "Apparatus Specification". When "Same Subnet" is selected, among the electronic apparatuses 300 on the internal network N, electronic apparatuses 300 in the same subnet as that where the information terminal 200 exists are selected as destinations. When "Apparatus Specification" is selected, the user can freely select one or more of the listed electronic apparatuses 300 as destinations.

In the transmission item setting area, transmission information items (decision parameters) can be specified for each job executing apparatus determining condition. In this example, for "Priority on Printing Speed", "number of active print jobs" and "model" of the electronic apparatus 300 are specified as transmission information items. For "Priority on Printing Cost", "duplex printing support" and "tray setting" are specified as transmission information items. For "Priority on Toner Amount", "amount of remaining toner" is specified as a transmission information item.

The information terminal 200 stores and manages the transmission information items specified on the configuration screen for each job executing apparatus determining condition in a configuration information storing unit 70. The configuration information storing unit 70 is, for example, implemented by a storage area of a storage unit of the information terminal 200.

FIG. 6 is a drawing illustrating exemplary configuration information 70D according to the present embodiment.

As illustrated in FIG. 6, the configuration information 70D includes "transmission item setting" information including one or more information sets (or records). Each information set includes a "condition" field and a "transmission information item" field.

The "condition" field stores identification information (which is hereafter referred to as "determining condition identification information") of a job executing apparatus determining condition. The determining condition identification information may be represented by, for example, a condition name or an identifier (condition ID) of a job executing apparatus determining condition. The "transmission information item" field stores one or more transmission information items (which may also be referred to as "transmission item information") specified for the corresponding job executing apparatus determining condition. The transmission information items may be represented by, for example, names or identifiers (parameter IDs) of decision parameters.

The configuration information 70D also includes "condition setting" information including a job executing apparatus determining condition specified on the setting screen of FIG. 4. The job execution requesting unit 21 obtains the job executing apparatus determining condition from the "condition setting" information in the configuration information 70D, and transmits the job executing apparatus determining condition together with requested job data of a job to the information processing apparatus 100 to request execution of the job.

Referring back to FIG. 3, the information transmission requesting unit 22 accesses the configuration information storing unit 70 to refer to the configuration information 70D. Based on the job executing apparatus determining condition transmitted to the information processing apparatus 100 to request execution of the job, the information transmission requesting unit identifies transmission information items (transmission item information) associated with the job executing apparatus determining condition. More specifically, the information transmission requesting unit 22 searches the "condition" field of the "transmission item setting" information in the configuration information 70D to identify transmission information items associated with the job executing apparatus determining condition. Then, the information transmission requesting unit 22 transmits the identified transmission information items to one or more electronic apparatuses 300 selected as destinations on the configuration screen of FIG. 5, and thereby requests the electronic apparatuses 300 to transmit their apparatus information corresponding to the transmission information items to the information processing apparatus 100.

The processing result receiving unit 23 is a functional unit of the information terminal 200 that receives a result of executing a job (job execution result) from the information processing apparatus 100. Based on the job execution result received from the information processing apparatus 100, the processing result receiving unit 23 displays a job execution result reporting screen as exemplified in FIG. 7.

Figures 7, 8:
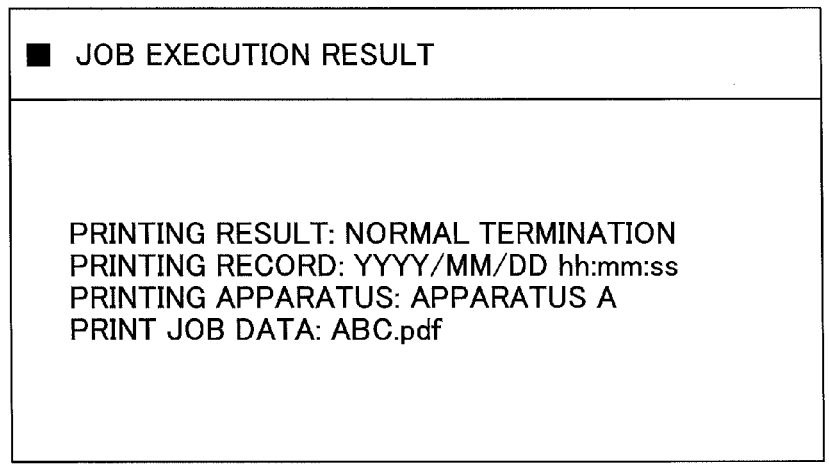
FIG. 7 is a drawing illustrating an example of a job execution result reporting screen according to the first embodiment.
FIG. 8 is a table illustrating an example of determining condition management information according to the first embodiment.

In the example of FIG. 7, the job execution result reporting screen includes "Printing Result" (normal termination (successful)/abnormal termination (failed)), "Printing Record" (date and time of execution), "Printing Apparatus" (name of executing apparatus), and "Print Job Data" (job file name). Thus, the user of the information terminal 200 who has requested execution of a job receives a job execution result indicating when the job is processed at which electronic apparatus 300. Thus, with the job control system 1 of the present embodiment, the user can correctly receive a job execution result even when the information processing apparatus 100 employs a push-type job control method where the information processing apparatus 100 dynamically determines an apparatus that executes a job.

<Electronic Apparatus>

The transmission request receiving unit 31 of the electronic apparatus 300 is a functional unit that receives an information transmission request from the information terminal 200 (the information transmission requesting unit 22). More specifically, the transmission request receiving unit 31 receives transmission item information (transmission information items) as an information transmission request from the information terminal 200.

The transmission information obtaining unit 32 is a functional unit that obtains transmission information (decision parameters) requested by the information transmission request. When the information transmission request is received from the information terminal 200, the transmission information obtaining unit 32 accesses an apparatus information storing unit 60 that stores apparatus information of the electronic apparatus 300. More specifically, the transmission information obtaining unit 32 obtains, from the apparatus information storing unit 60, apparatus information (decision parameters) corresponding to the transmission item information (transmission information items) specified in the information transmission request received by the transmission request receiving unit 31. The apparatus information storing unit 60 may be implemented, for example, by a storage area of a storage unit of the electronic apparatus 300 and may store apparatus information such as status information and configuration information of the electronic apparatus 300.

The information transmission unit 33 of the electronic apparatus 300 is a functional unit that transmits transmission information (i.e., apparatus information corresponding to specified transmission information items) to the information processing apparatus 100. The information transmission unit 33 transmits the apparatus information obtained by the transmission information obtaining unit 32 to the information processing apparatus 100. Thus, in the job control system 1 of the present invention, the electronic apparatuses 300 selected as execution apparatus candidates transmit, to the information processing apparatus 100, decision parameters used in a determination process to determine an executing electronic apparatus 300 suitable to execute a requested job. Also, as a result of this process, communication connections are established between the electronic apparatuses 300 and the information processing apparatus 100.

The job execution unit 34 is a functional unit of the electronic apparatus 300 that executes a job requested by the information processing apparatus 100. The job execution unit 34 processes execution data of a requested job received from the information processing apparatus 100 according to specified execution conditions. Then, the job execution unit 34 transmits a result of executing the job (job execution result) to the information processing apparatus 100.

<Information Processing Apparatus>

The execution request receiving unit 11 of the information processing apparatus 100 is a functional unit that receives a job execution request from the information terminal 200 (the job execution requesting unit 21). The execution request receiving unit 11 receives requested job data and a job executing apparatus determining condition as the job execution request from the information terminal 200. The execution request receiving unit 11 stores the requested job data in a job storing unit 90 and stores the job executing apparatus determining condition in a determining condition management information storing unit 80. The job storing unit 90 and the determining condition management information storing unit 80 are implemented by, for example, storage areas of a storage unit of the information processing apparatus 100.

The job storing unit 90 stores and manages requested job data received from the information terminals 200 for respective requested jobs. The determining condition management information storing unit 80 stores and manages job executing apparatus determining conditions received from the information terminals 200 for respective requested jobs.

FIG. 8 is a table illustrating an example of determining condition management information 80D according to the present embodiment.

As illustrated in FIG. 8, the determining condition management information 80D includes one or more information sets each including a "job identification" field and a "condition" field.

The "job identification" field stores identification information (which is hereafter referred to as "job identification information") of a requested job. The job identification information may be represented by, for example, an identifier (job ID) that is generated for the requested job when the job execution request is received. The "condition" field stores a job executing apparatus determining condition included in the job execution request received from the information terminal 200.

Thus, the information processing apparatus 100 uses the determining condition management information 80D to manage received job executing apparatus determining conditions in association with job identification information of requested jobs. The requested job data may also be associated with the job identification information. With the determining condition management information 80D, the information processing apparatus 100 can identify a job executing apparatus determining condition for a requested job based on the job identification information of the requested job.

Referring back to FIG. 3, the information receiving unit 12 is a functional unit of the information processing apparatus 100 that receives information transmitted from the electronic apparatus 300 (the information transmission unit 33). More specifically, the information receiving unit 12 receives apparatus information (decision parameters) corresponding to specified transmission information items from the electronic apparatus 300. When plural electronic apparatus 300 are requested by the information terminal 200 to transmit apparatus information, the information processing apparatus 100 receives plural sets of apparatus information. For this reason, the information receiving unit 12 receives information transmitted from the electronic apparatuses 300 for a predetermined period of time (i.e., until a predetermined period of time elapses) after a job execution request is received.

The job executing apparatus determining unit 13 is a functional unit of the information processing apparatus 100 that determines an executing electronic apparatus 300 suitable to execute a requested job. More specifically, when apparatus information (decision parameters) are received from the electronic apparatuses 300, the job executing apparatus determining unit 13 accesses the determining condition management information storing unit 80. Next, the job executing apparatus determining unit 13 refers to the determining condition management information 80D and identifies a job executing apparatus determining condition corresponding to the requested job. Then, the job executing apparatus determining unit 13 performs a determination process based on the identified job executing apparatus determining condition and the apparatus information (decision parameters) to determine one of the electronic apparatuses 300 having apparatus information (decision parameters) that meets the identified job executing apparatus determining condition as an executing electronic apparatus 300 suitable to execute the requested job.

Exemplary determination processes for respective cases where the job executing apparatus determining condition is "Priority on Printing Speed", "Priority on Printing Cost", or "Priority on Toner Amount" are described below.

(Determining Condition 1: "Priority on Printing Speed")

When "Priority on Printing Speed" is specified as the job executing apparatus determining condition, one of candidate electronic apparatuses 300 (printing apparatus candidates or executing apparatus candidates) that can process a requested print job at the fastest speed is selected. The processing speed may be determined based on, for example, the model and the status (processing load of executing a job) of the electronic apparatus 300.

In this case, the job executing apparatus determining unit 13 sorts the printing apparatus candidates, from which apparatus information has been received, in descending order of processing speed based on model information (model identifiers) included in configuration information in the received apparatus information. Next, the job executing apparatus determining unit 13 determines whether each of the printing apparatus candidates is currently printing (whether it is processing a job) based on information indicating the number of active print jobs included in status information in the received apparatus information. The job executing apparatus determining unit 13 performs this determining step for each of the printing apparatus candidates in the sorted order. When a printing apparatus candidate not currently printing is found, the job executing apparatus determining unit 13 may stop repeating the determining step for the remaining printing apparatus candidates. Through this above process, the job executing apparatus determining unit 13 selects a printing apparatus candidate that has the fastest processing speed among the printing apparatus candidates that are not currently printing as the executing electronic apparatus 300 for executing the requested print job.

In the above exemplary process, the printing apparatus candidates are sorted in descending order of processing speed. However, the printing apparatus candidates may be sorted based on any other criteria. For example, the printing apparatus candidates may be sorted in descending order of information reception (or transmission) time that can also be used to estimate the processing speed of the printing apparatus candidates. In this case, the job executing apparatus determining unit 13 sorts the printing apparatus candidates in descending order of information reception time indicating the date and time when apparatus information is received from the printing apparatus candidates. The date and time may be obtained from a clock circuit (not shown) of the information processing apparatus 100 when apparatus information is received from each printing apparatus candidate.

(Determining Condition 2: "Priority on Printing Cost")

When "Priority on Printing Cost" is specified as the job executing apparatus determining condition, one of candidate electronic apparatuses 300 (printing apparatus candidates or executing apparatus candidates) that can execute a requested print job at the lowest cost is selected. The printing cost can be determined based on, for example, whether the electronic apparatus 300 includes functions that can reduce the use of consumables.

In this case, the job executing apparatus determining unit 13 determines whether each of the printing apparatus candidates supports duplex printing (or includes a duplex printing function) based on duplex printing support information (indicating whether the duplex printing function is available) included in configuration information in the received apparatus information. Next, the job executing apparatus determining unit 13 determines whether each of the printing apparatus candidates supporting duplex printing supports printing on backside-printed paper on the back side of which information has already been printed (or includes a paper-feed tray where backside-printed paper is set) based on tray setting information (e.g., identifiers indicating paper sizes and paper types) included in configuration information in the received apparatus information. The job executing apparatus determining unit 13 performs this determining step for each of the printing apparatus candidates supporting duplex printing. When a printing apparatus candidate supporting both duplex printing and printing on backside-printed paper is found, the job executing apparatus determining unit 13 may stop repeating the determining step for the remaining printing apparatus candidates. Through this above process, the job executing apparatus determining unit 13 selects a printing apparatus candidate, which supports both duplex printing and printing on backside-printed paper and therefore can execute a requested print job at the lowest cost, as the executing electronic apparatus 300 for executing the requested print job.

(Determining Condition 3: "Priority on Toner Amount")

When "Priority on Toner Amount" is specified as the job executing apparatus determining condition, one of candidate electronic apparatuses 300 (printing apparatus candidates or executing apparatus candidates) that contains the largest amount of remaining toner among the candidate electronic apparatuses 300 capable of processing a requested print job is selected. This can be done, for example, by comparing the amounts of remaining toner (consumables) of the electronic apparatuses 300.

The job executing apparatus determining unit 13 sorts the printing apparatus candidates, from which apparatus information has been received, in descending order of the amount of remaining toner based on remaining toner amount information included in status information in the received apparatus information. Then, based on the result of sorting, the job executing apparatus determining unit 13 selects one of the printing apparatus candidates which has the largest amount of remaining toner as the executing electronic apparatus 300 for executing the requested print job.

As described above, the information processing apparatus 100 performs a determination process based on a job executing apparatus determining condition included in a job execution request and apparatus information (decision parameters) received from one or more electronic apparatuses 300 to determine an executing electronic apparatus 300 suitable to execute a requested job.

The data conversion unit 14 of the information processing apparatus 100 is a functional unit that converts job data (requested job data) of a requested job requested by the information terminal 200 (the job execution requesting unit 21) into data (execution data of the requested job) that the executing electronic apparatus 300 can process. More specifically, the data conversion unit 14 obtains requested job data from the job storing unit 90, in which the requested job data is stored when a job execution request is received from the information terminal 200, and converts the requested job data into data that the executing electronic apparatus 300 determined by the job executing apparatus determining unit 13 can process.

For example, when the requested job is a print job, the data conversion unit 14 converts the requested job data into print data that the printing function of the executing electronic apparatus 300 can process. More specifically, the data conversion unit 14 converts application data of the print job into Page Description Language (PDL) data or raster data (bitmap data) that the executing electronic apparatus 300 can print. As another example, when the requested job is a display job (or projection job), the data conversion unit 14 converts the requested job data into display data (or projection data) that the display function (or projection function) of the executing electronic apparatus 300 can process. More specifically, the data conversion unit 14 converts application data of the display job (or projection job) into image data (e.g., JPEG data) that the executing electronic apparatus 300 can display (or project).

After converting the requested job data, the data conversion unit 14 transmits the converted data to the executing electronic apparatus 300 (the job execution unit 34) to request execution of the requested job. More specifically, the data conversion unit 14 transmits the converted data to the executing electronic apparatus 300 via a communication connection established when apparatus information is transmitted from the executing electronic apparatus 300 to the information processing apparatus 100.

The processing result reporting unit 15 is a functional unit of the information processing apparatus 100 that reports a job execution result to the information terminal 200 (the processing result receiving unit 23). Based on a job execution result received from the electronic apparatus 300 (the job execution unit 34), the processing result reporting unit 15 generates report data for reporting the job execution result and transmits the report data to the information terminal 200. More specifically, the processing result reporting unit 15 transmits the report data for reporting the job execution result to the information terminal 200 via a communication connection established when the job execution request is transmitted from the information terminal 200 to the information processing apparatus 100.

As described above, the job control function of the present embodiment is provided through collaboration among the functional units. The above functional units are implemented by executing programs (software for implementing the job control function) installed in the respective apparatuses constituting the job control system 1. For example, in each apparatus, the programs are loaded by a processor (e.g., CPU) from a storage unit (e.g., ROM or HDD) into a memory (e.g., RAM) and are executed to implement the corresponding functional units.

An exemplary job control process (collaboration among the functional units) according to the present embodiment is described in more detail below with reference to sequence charts and a flowchart.

<Job Control Process>

Figure 9:
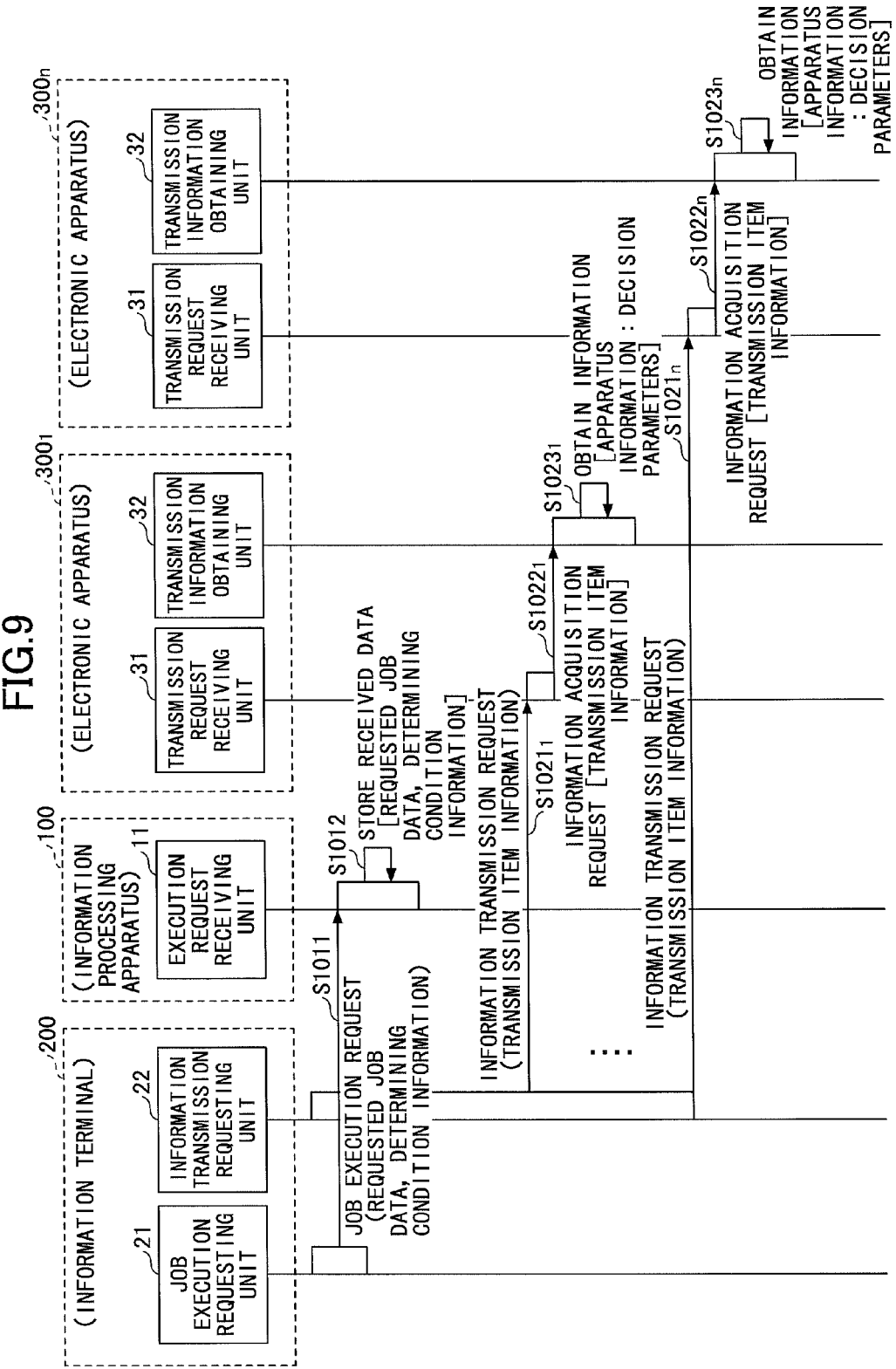
FIG. 9 is a sequence chart illustrating a part (1) of an exemplary job control process according to the first embodiment.

FIG. 9 is a sequence chart illustrating a part (1) of an exemplary job control process according to the present embodiment. FIG. 9 illustrates a part of the job control process where the information terminal 200 requests the information processing apparatus 100 to execute a job, and also requests the electronic apparatuses 300 to transmit information to the information processing apparatus 100.

As illustrated in FIG. 9, the job execution requesting unit 21 of the information terminal 200 transmits a job execution request to the information processing apparatus 100 (the execution request receiving unit 11) to request execution of a requested job (step S1011). In this step, the job execution requesting unit transmits requested job data of the requested job specified via an interface by the user to the information processing apparatus 100. Also in this step, the job execution requesting unit 21 transmits a job executing apparatus determining condition corresponding to the requested job to the information processing apparatus 100.

The execution request receiving unit 11 of the information processing apparatus 100 receives the job execution request including the requested job data and the job executing apparatus determining condition from the information terminal 200 (the job execution requesting unit 21) and stores the requested job data and the job executing apparatus determining condition in predetermined storage areas (step S1012). The execution request receiving unit 11 stores the requested job data in the job storing unit 90 and stores the job executing apparatus determining condition in the determining condition management information storing unit 80. More specifically, the execution request receiving unit 11 generates job identification information for the requested job and stores the requested job data and the job executing apparatus determining condition in association with the generated job identification information in the respective storage areas. As a result, the determining condition management information 80D (i.e., an information set) for the requested job is generated in the determining condition management information storing unit 80.

At the timing when the job execution request is transmitted, the information transmission requesting unit 22 of the information terminal 200 requests one or more electronic apparatuses 300 (the transmission request receiving unit 31) to transmit information to the information processing apparatus 100 (the information receiving unit 12) (step S1021). More specifically, based on the job executing apparatus determining condition corresponding to the requested job, the information transmission requesting unit 22 requests the electronic apparatuses 300 to transmit decision parameters (apparatus information available from the electronic apparatuses 300) used in a determination process to determine an executing electronic apparatus 300.

The information terminal 200 stores and manages transmission information items specified for each job executing apparatus determining condition in the configuration information storing unit 70. The information transmission requesting unit 22 refers to the configuration information 70D in the configuration information storing unit 70 and identifies transmission information items (transmission item information) corresponding to the job executing apparatus determining condition transmitted as the job execution request. More specifically, the information transmission requesting unit 22 searches the "condition" field of the "transmission item setting" information in the configuration information 70D to identify transmission information items associated with the job executing apparatus determining condition. Then, the information transmission requesting unit 22 transmits an information transmission request including the identified transmission information items to one or more electronic apparatuses 300.

When receiving the information transmission request, the transmission request receiving unit 31 of the electronic apparatus 300 requests the transmission information obtaining unit 32 to obtain information corresponding to the transmission information items in the information transmission request (step S1022). In this step, the transmission request receiving unit 31 inputs the transmission information items received as the information transmission request to the transmission information obtaining unit 32.

The transmission information obtaining unit 32 of the electronic apparatus 300 obtains apparatus information (decision parameters) corresponding to the transmission information items (step S1023).

The electronic apparatus 300 stores apparatus information including status information and configuration information in the apparatus information storing unit 60. The transmission information obtaining unit 32 obtains apparatus information corresponding to the transmission information items received from the transmission request receiving unit 31 from the apparatus information storing unit 60.

Steps S1021 through S1023 may be performed as described below. The user can specify, via a predetermined interface of the information terminal 200, one or more electronic apparatuses 300 as destinations of an information transmission request. The information transmission requesting unit 22 transmits an information transmission request including transmission information items (transmission item information) to the electronic apparatuses 300 specified as destinations. This configuration allows the information terminal 200 to freely select electronic apparatuses 300 that can communicate with the information terminal 200 and to request the selected electronic apparatuses 300 to transmit information to the information processing apparatus 100.

FIG. 10 is a sequence chart illustrating a part (2) of the exemplary job control process according to the present embodiment. FIG. 10 illustrates a part of the job control process where the information processing apparatus 100 determines an executing electronic apparatus 300 suitable to execute a job requested by the information terminal 200 based on apparatus information received from the electronic apparatuses 300, requests the executing electronic apparatus 300 to execute the requested job, and transmits a job execution result reported by the executing electronic apparatus 300 to the information terminal 200.

As illustrated in FIG. 10, after obtaining the apparatus information (step S1023), the transmission information obtaining unit 32 of the electronic apparatus 300 requests the information transmission unit 33 to transmit the obtained apparatus information (step S201). In this step, the transmission information obtaining unit inputs the obtained apparatus information (decision parameters) to the information transmission unit 33.

The information transmission unit 33 of the electronic apparatus 300 transmits the apparatus information received from the transmission information obtaining unit 32 to the information processing apparatus 100 (the information receiving unit 12) (step S202).

When receiving the apparatus information from one or more electronic apparatuses 300, the information receiving unit 12 of the information processing apparatus 100 requests the job executing apparatus determining unit 13 to determine an executing electronic apparatus 300 for executing the requested job (step S203). In this step, the information receiving unit 12 inputs the apparatus information received from the electronic apparatuses 300 to the job executing apparatus determining unit 13.

The job executing apparatus determining unit 13 of the information processing apparatus 100 determines an executing electronic apparatus 300 suitable to execute the requested job (step S204). In this step, the job executing apparatus determining unit 13 refers to the determining condition management information 80D in the determining condition management information storing unit 80 and identifies a job executing apparatus determining condition corresponding to the requested job. Then, the job executing apparatus determining unit 13 performs a determination process based on the identified job executing apparatus determining condition and the apparatus information (decision parameters) to determine one of the electronic apparatuses 300 having apparatus information that meets the identified job executing apparatus determining condition as an executing electronic apparatus 300. Details of the determination process are described later with reference to FIG. 11.

When the executing electronic apparatus 300 is determined, the job executing apparatus determining unit 13 of the information processing apparatus 100 requests the data conversion unit 14 to convert the requested job data (step S205). In this step, the job executing apparatus determining unit 13 inputs information (e.g., model information) indicating the executing electronic apparatus 300 to the data conversion unit 14.

The data conversion unit 14 of the information processing apparatus 100 obtains the requested job data from the job storing unit 90, in which the requested job data is stored when the job execution request is received from the information terminal 200, and converts the requested job data into data that the executing electronic apparatus 300 determined by the job executing apparatus determining unit 13 can process (step S206). In this step, the data conversion unit 14 identifies a data format (after conversion) that the executing electronic apparatus 300 can process based on the information (e.g., model information) of the executing electronic apparatus 300 and converts the requested job data according to the identified data format.

After converting the requested job data, the data conversion unit 14 of the information processing apparatus 100 requests the executing electronic apparatus 300 (the job execution unit 34) to execute the requested job (step S207). In this step, the data conversion unit transmits the converted data (execution data of the requested job) to the executing electronic apparatus 300 via a communication connection established when the apparatus information is transmitted from the executing electronic apparatus to the information processing apparatus 100.

When receiving the execution data of the requested job, the job execution unit 34 of the executing electronic apparatus 300 execute the requested job (step S208). In this step, the job execution unit 34 processes the execution data of the requested job received from the information processing apparatus 100 according to specified execution conditions.

After executing the requested job, the job execution unit 34 of the executing electronic apparatus 300 reports or transmits a job execution result indicating the result of executing the requested job to the information processing apparatus 100 (the data conversion unit 14) (step S209).

When receiving the job execution result, the data conversion unit 14 of the information processing apparatus 100 requests the processing result reporting unit 15 to generate report data for reporting the job execution result (step S210). In this step, the data conversion unit 14 inputs the job execution result received from the executing electronic apparatus 300 to the processing result reporting unit 15.

The processing result reporting unit 15 of the information processing apparatus 100 generates the report data based on the job execution result received from the data conversion unit 14 (step S211).

After generating the report data for reporting the job execution result, the processing result reporting unit 15 of the information processing apparatus 100 transmits the report data to the information terminal 200 (the processing result receiving unit 23) (step S212). In this step, the processing result reporting unit 15 transmits the report data to the information terminal 200 via a communication connection established when the job execution request is transmitted from the information terminal 200 to the information processing apparatus 100.

When receiving the report data from the information processing apparatus 100, the processing result receiving unit 23 of the information terminal 200 displays the job execution result on an execution result screen based on the report data (step S213).

As described above, in the job control system 1 of the present embodiment, one or more electronic apparatuses 300 (executing apparatus candidates) are requested to report their apparatus information to the information processing apparatus 100, and the information processing apparatus 100 determines an executing electronic apparatus 300 that is suitable to execute a requested job based on the reported apparatus information. Also in the job control system 1 of the present embodiment, the information processing apparatus 100 transmits execution data of the requested job to the executing electronic apparatus 300 via a communication connection established when the apparatus information is transmitted from the executing electronic apparatus 300.

With the above configuration, the job control system 1 of the present embodiment makes it possible to dynamically determine an executing apparatus suitable to execute a requested job and to execute the requested job at the determined executing apparatus.

<Job Executing Apparatus Determining Process>

FIG. 11 is a flowchart illustrating an exemplary job executing apparatus determining process (which may also be referred to as a "determination process") according to the present embodiment. The job executing apparatus determining process of FIG. 11 corresponds to step S204 of FIG. 10 performed by the job executing apparatus determining unit 13. In FIG. 11, it is assumed that the job executing apparatus determining condition is one of "Priority on Printing Speed", "Priority on Printing Cost", and "Priority on Toner Amount".

As illustrated in FIG. 11, the job executing apparatus determining unit 13 determines whether apparatus information (decision parameters) has been received by the information receiving unit 12 from one or more electronic apparatuses 300 (the information transmission unit 33) and thereby determines whether executing apparatus candidates exist (step S11).

When it is determined that apparatus information (decision parameters) is received from one or more electronic apparatuses 300 (i.e., executing apparatus candidates) (YES in step S11), the job executing apparatus determining unit 13 refers to the determining condition management information 80D to identify a job executing apparatus determining condition corresponding to the requested job (step S12).

Next, the job executing apparatus determining unit 13 determines the type of the identified job executing apparatus determining condition (step S13).

When the identified job executing apparatus determining condition is "Priority on Printing Speed", the job executing apparatus determining unit 13 sorts the executing apparatus candidates in descending order of processing speed or information reception (or transmission) time (step S14). When sorting the executing apparatus candidates in descending order of processing speed, the job executing apparatus determining unit 13 sorts the executing apparatus candidates based on model information (model identifiers) included in configuration information in the received apparatus information. Meanwhile, when sorting the executing apparatus candidates in descending order of information reception time, the job executing apparatus determining unit 13 sorts the executing apparatus candidates based on the date and time when the apparatus information is received from the executing apparatus candidates.

Next, the job executing apparatus determining unit 13 determines whether each of the executing apparatus candidates is currently printing (i.e., whether it is processing a job) in the sorted order (step S15). More specifically, the job executing apparatus determining unit 13 determines whether each of the printing apparatus candidates is currently printing based on information indicating the number of active print jobs included in status information in the received apparatus information.

When it is determined that an executing apparatus candidate is not currently printing (NO in step S15), the job executing apparatus determining unit 13 determines the executing apparatus candidate as an executing electronic apparatus 300 for executing the requested job (step S16). In this case, the job executing apparatus determining unit 13 may stop repeating step S15 for the remaining printing apparatus candidates. Thus, when the job executing apparatus determining condition is "Priority on Printing Speed", the information processing apparatus 100 selects an executing apparatus candidate that has the fastest processing speed among the executing apparatus candidates that are not currently printing as the executing electronic apparatus 300 for executing the requested job.

When the identified job executing apparatus determining condition is "Priority on Printing Cost", the job executing apparatus determining unit 13 determines whether each of the executing apparatus candidates supports duplex printing (step S17). More specifically, the job executing apparatus determining unit 13 determines whether each of the printing apparatus candidates supports duplex printing (or includes a duplex printing function) based on duplex printing support information (indicating whether the duplex printing function is available) included in configuration information in the received apparatus information.

When one or more executing apparatus candidates supporting duplex printing are found (YES in step S17), the job executing apparatus determining unit 13 determines whether each of the found executing apparatus candidates supports printing on backside-printed paper on the back side of which information has already been printed (step S18). More specifically, the job executing apparatus determining unit 13 determines whether each of the found executing apparatus candidates supports printing on backside-printed paper (or includes a paper-feed tray where backside-printed paper is set) based on tray setting information (e.g., identifiers indicating paper sizes and paper types) included in configuration information in the received apparatus information.

The job executing apparatus determining unit 13 performs step S17 for each of the executing apparatus candidates and performs step S18 for each of the executing apparatus candidates supporting duplex printing.

When it is determined that an executing apparatus candidate supports both duplex printing and printing on backside-printed paper (YES in step S18), the job executing apparatus determining unit 13 determines the executing apparatus candidate as an executing electronic apparatus 300 for executing the requested job (step S16). In this case, the job executing apparatus determining unit 13 may stop repeating step S18 for the remaining printing apparatus candidates. Thus, when the job executing apparatus determining condition is "Priority on Printing Cost", the information processing apparatus 100 selects an executing apparatus candidate that can process the requested job at the lowest cost as the executing electronic apparatus 300 for executing the requested job.

When the identified job executing apparatus determining condition is "Priority on Toner Amount", the job executing apparatus determining unit 13 sorts the executing apparatus candidates in descending order of the amount of remaining toner (step S19). More specifically, the job executing apparatus determining unit 13 sorts the executing apparatus candidates based on remaining toner amount information included in status information in the received apparatus information.

Next, the job executing apparatus determining unit 13 identifies one of the executing apparatus candidates that contains the largest amount of remaining toner (step S20). More specifically, the job executing apparatus determining unit 13 identifies an executing apparatus candidate that is on the top of the sorted executing apparatus candidates.

Then, the job executing apparatus determining unit 13 determines the identified executing apparatus candidate as an executing electronic apparatus 300 for executing the requested job (step S16). Thus, when the job executing apparatus determining condition is "Priority on Toner Amount", the information processing apparatus 100 selects an executing apparatus candidate that contains the largest amount of remaining toner as the executing electronic apparatus 300 for executing the requested job.

As described above, the information processing apparatus 100 performs a determination process based on a job executing apparatus determining condition included in a job execution request and apparatus information (decision parameters) received from one or more electronic apparatuses 300 to determine an executing electronic apparatus 300 suitable to execute a requested job.

Meanwhile, when it is determined that no apparatus information (decision parameters) has been received (i.e., when no executing apparatus candidate exists) (NO in step S11), the job executing apparatus determining unit 13 performs a predetermined error process (step S21). As the error process performed in this case, for example, the job executing apparatus determining unit 13 may report that no executing apparatus candidate has been found (or no apparatus information has been received).

The job executing apparatus determining unit 13 also performs a predetermined error process (step S21) when all the executing apparatus candidates are currently printing (YES in step S15), when no executing apparatus candidate supports duplex printing (NO in step S17), or when no executing apparatus candidate supports printing on backside-printed paper (NO in step S18). As the error process performed in this case, for example, the job executing apparatus determining unit 13 may report that no executing apparatus candidate suitable to execute the requested job has been found.

<Summary>

As described above, in the job control system 1 of the present embodiment, the job execution requesting unit 21 of the information terminal 200 transmits requested job data to the information processing apparatus 100 to request execution of a requested job, and the information transmission requesting unit 22 of the information terminal 200 requests the electronic apparatuses 300 to transmit apparatus information to the information processing apparatus 100. When receiving the request from the information terminal 200, the information transmission unit 33 of each of the electronic apparatuses 300 transmits apparatus information to the information processing apparatus 100. The job executing apparatus determining unit 13 of the information processing apparatus 100 performs a determination process based on the apparatus information received from the electronic apparatuses 300 to determine an executing electronic apparatus 300 suitable to execute the requested job. When the executing electronic apparatus 300 is determined, the data conversion unit 14 of the information processing apparatus 100 converts the requested job data received from the information terminal 200 into data that the executing electronic apparatus 300 can process (i.e., generates execution data of the requested job). Next, the data conversion unit 14 of the information processing apparatus 100 transmits the converted data to the executing electronic apparatus 300 via a communication connection established between the executing electronic apparatus 300 and the information processing apparatus 100 for transmission and reception of the apparatus information, and thereby requests the executing electronic apparatus 300 to execute the requested job. Then, the job execution unit 34 of the executing electronic apparatus 300 properly executes the requested job.

With the above configuration, the job control system 1 of the present embodiment makes it possible to dynamically determine an executing apparatus suitable to execute a requested job and to execute the requested job at the determined executing apparatus. In other words, the job control system 1 can provide a convenient and efficient job control service.

Second Embodiment

In the first embodiment, an executing electronic apparatus 300 for a requested job is determined based on a job executing apparatus determining condition predetermined for the requested job.

In a second embodiment, plural job executing apparatus determining conditions are used in order of priority to determine an executing electronic apparatus 300 for a requested job. Below, differences between the first embodiment and the second embodiment are mainly discussed, and descriptions overlapping those in the first embodiment may be omitted.

According to the second embodiment, the information terminal 200 stores and manages configuration information 70D as illustrated in FIG. 12.

<Information Terminal>

FIG. 12 is a drawing illustrating exemplary configuration information 70D according to the second embodiment.

As illustrated in FIG. 12, the configuration information 70D of the second embodiment includes "condition setting" information that includes plural job executing apparatus determining conditions to which priority levels are assigned. The job executing apparatus determining conditions are used to determine an executing electronic apparatus 300 in descending order of the priority levels. In the second embodiment, the priority levels are indicated by numbers and a smaller number indicates a higher priority level. Thus, in the second embodiment, the "condition setting" information includes plural job executing apparatus determining conditions to which priority levels are assigned.

The job execution requesting unit 21 obtains job executing apparatus determining conditions with priority levels from the "condition setting" information in the configuration information 70D, and transmits the job executing apparatus determining conditions together with requested job data to the information processing apparatus 100 to request execution of a requested job.

<Information Processing Apparatus>

The execution request receiving unit 11 of the information processing apparatus 100 stores and manages the job executing apparatus determining conditions received from the respective information terminals 200 as determining condition management information 80D as illustrated in FIG. 13. The determining condition management information 80D is stored in the determining condition management information storing unit 80.

FIG. 13 is a table illustrating an example of the determining condition management information 80D according to the second embodiment.

As illustrated in FIG. 13, the determining condition management information 80D of the second embodiment includes one or more information sets each including a "job identification" field and a "condition" field. The "job identification" field stores identification information (job ID) that is generated for the corresponding requested job when the job execution request is received. The "condition" field stores plural job executing apparatus determining conditions with priority levels. Thus, in the determining condition management information 80D, job executing apparatus determining conditions with priority levels are stored in association with identification information of requested jobs.

When apparatus information (decision parameters) is received from the electronic apparatuses 300, the job executing apparatus determining unit 13 accesses the determining condition management information storing unit 80. The job executing apparatus determining unit 13 refers to the determining condition management information 80D and identifies job executing apparatus determining conditions corresponding to the requested job. Also, the job executing apparatus determining unit 13 selects one of the job executing apparatus determining conditions to be used in a determination process based on their priority levels.

Then, the job executing apparatus determining unit 13 performs a determination process based on the identified job executing apparatus determining conditions and the apparatus information (decision parameters) to determine one of the electronic apparatuses 300 having apparatus information (decision parameters) that meets one of the identified job executing apparatus determining conditions as an executing electronic apparatus 300 suitable to execute the requested job.

In the determination process, if no electronic apparatus 300 having apparatus information that meets a job executing apparatus determining condition with the highest priority level is found, the job executing apparatus determining unit 13 uses another job executing apparatus determining condition with the next highest priority level.

Thus, the job executing apparatus determining unit 13 of the information processing apparatus 100 of the second embodiment determines an executing electronic apparatus 300 by applying plural job executing apparatus determining conditions in descending order of the priority levels.

As described above, the job control function of the second embodiment is provided through collaboration among the functional units.

An exemplary job executing apparatus determining process (operations of the job executing apparatus determining unit 13) according to the second embodiment is described below with reference to a flowchart.

<Job Executing Apparatus Determining Process>

Figure 14:
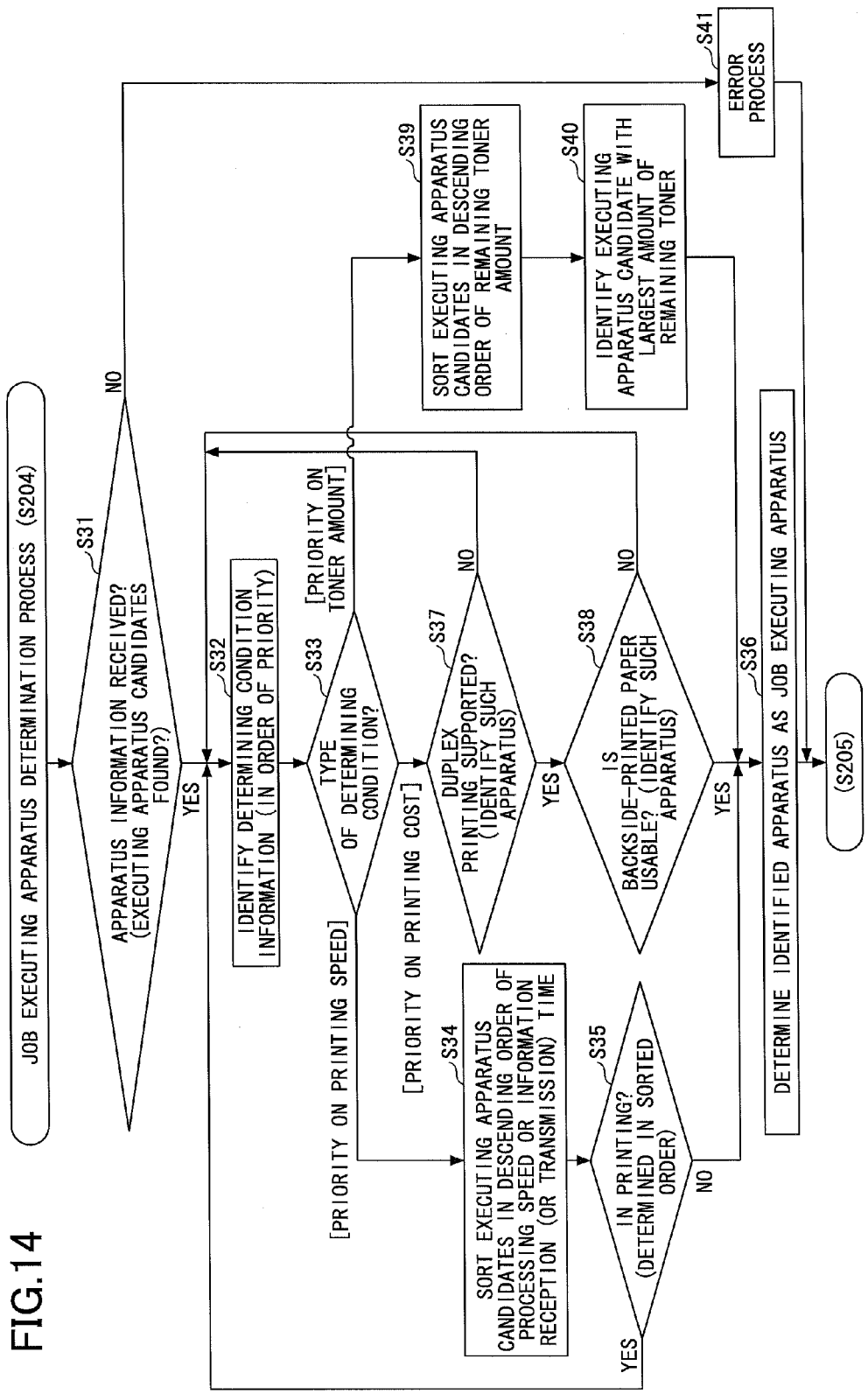
FIG. 14 is a flowchart illustrating an exemplary job executing apparatus determining process according to the second embodiment.

FIG. 14 is a flowchart illustrating an exemplary job executing apparatus determining process according to the second embodiment. In FIG. 14, it is assumed that the job executing apparatus determining conditions are "Priority on Printing Speed", "Priority on Printing Cost", and "Priority on Toner Amount".

As illustrated in FIG. 14, the job executing apparatus determining unit 13 determines whether apparatus information (decision parameters) has been received by the information receiving unit 12 from one or more electronic apparatuses 300 (the information transmission unit 33) and thereby determines whether executing apparatus candidates exist (step S31).

When it is determined that apparatus information (decision parameters) has been received from one or more electronic apparatuses 300 (i.e., executing apparatus candidates) (YES in step S31), the job executing apparatus determining unit 13 refers to the determining condition management information 80D to identify job executing apparatus determining conditions corresponding to the requested job (step S32). Also, the job executing apparatus determining unit 13 selects one of the job executing apparatus determining conditions based on their priority levels.

Next, the job executing apparatus determining unit 13 determines the type of the selected job executing apparatus determining condition (step S33).

When the selected job executing apparatus determining condition is "Priority on Printing Speed", the job executing apparatus determining unit 13 sorts the executing apparatus candidates in descending order of processing speed or information reception (or transmission) time (step S34). When sorting the executing apparatus candidates in descending order of processing speed, the job executing apparatus determining unit 13 sorts the executing apparatus candidates based on model information (model identifiers) included in configuration information in the received apparatus information. Meanwhile, when sorting the executing apparatus candidates in descending order of information reception time, the job executing apparatus determining unit 13 sorts the executing apparatus candidates based on the date and time when the apparatus information is received from the executing apparatus candidates.

Next, the job executing apparatus determining unit 13 determines whether the executing apparatus candidates are currently printing (i.e., executing a job) in the sorted order (step S35). More specifically, the job executing apparatus determining unit 13 determines whether each of the printing apparatus candidates is currently printing based on information indicating the number of active print jobs included in status information in the received apparatus information.

When it is determined that an executing apparatus candidate is not currently printing (NO in step S35), the job executing apparatus determining unit 13 determines the executing apparatus candidate as an executing electronic apparatus 300 for executing the requested job (step S36). In this case, the job executing apparatus determining unit 13 may stop repeating step S35 for the remaining printing apparatus candidates. Thus, when the selected job executing apparatus determining condition is "Priority on Printing Speed", the information processing apparatus 100 selects an executing apparatus candidate that has the fastest processing speed among the executing apparatus candidates that are not currently printing as the executing electronic apparatus 300 for executing the requested print job.

When the selected job executing apparatus determining condition is "Priority on Printing Cost", the job executing apparatus determining unit 13 determines whether each of the executing apparatus candidates supports duplex printing (step S37). More specifically, the job executing apparatus determining unit 13 determines whether each of the printing apparatus candidates supports duplex printing (or includes a duplex printing function) based on duplex printing support information (indicating whether the duplex printing function is available) included in configuration information in the received apparatus information.

When one or more executing apparatus candidates supporting duplex printing are found (YES in step S37), the job executing apparatus determining unit 13 determines whether each of the found executing apparatus candidates supports printing on backside-printed paper on the back side of which information has already been printed (step S38). More specifically, the job executing apparatus determining unit 13 determines whether each of the found executing apparatus candidates supports printing on backside-printed paper (or includes a paper-feed tray where backside-printed paper is set) based on tray setting information (e.g., identifiers indicating paper sizes and paper types) included in configuration information in the received apparatus information.

The job executing apparatus determining unit 13 performs step S37 for each of the executing apparatus candidates and performs step S38 for each of the executing apparatus candidates supporting duplex printing.

When it is determined that an executing apparatus candidate supports both duplex printing and printing on backside-printed paper (YES in step S38), the job executing apparatus determining unit 13 determines the executing apparatus candidate as an executing electronic apparatus 300 for executing the requested job (step S36). In this case, the job executing apparatus determining unit 13 may stop repeating step S38 for the remaining printing apparatus candidates. Thus, when the selected job executing apparatus determining condition is "Priority on Printing Cost", the information processing apparatus 100 selects an executing apparatus candidate that can process the requested job at the lowest cost as the executing electronic apparatus 300 for executing the requested job.

When the selected job executing apparatus determining condition is "Priority on Toner Amount", the job executing apparatus determining unit 13 sorts the executing apparatus candidates in descending order of the amount of remaining toner (step S39). More specifically, the job executing apparatus determining unit 13 sorts the executing apparatus candidates based on remaining toner amount information included in status information in the received apparatus information.

Next, the job executing apparatus determining unit 13 identifies one of the executing apparatus candidates that contains the largest amount of remaining toner (step S40). More specifically, the job executing apparatus determining unit 13 identifies an executing apparatus candidate that is on the top of the sorted executing apparatus candidates.

Then, the job executing apparatus determining unit 13 determines the identified executing apparatus candidate as an executing electronic apparatus 300 for executing the requested job (step S36). Thus, when the selected job executing apparatus determining condition is "Priority on Toner Amount", the information processing apparatus 100 selects an executing apparatus candidate that contains the largest amount of remaining toner as the executing electronic apparatus 300 for executing the requested job.

As described above, the information processing apparatus 100 performs a determination process based on job executing apparatus determining conditions included in a job execution request and apparatus information (decision parameters) received from one or more electronic apparatuses 300 to determine an executing electronic apparatus 300 suitable to execute a requested job.

Meanwhile, when it is determined that no apparatus information (decision parameters) has been received (i.e., when no executing apparatus candidate exists) (NO in step S31), the job executing apparatus determining unit 13 performs a predetermined error process (step S41). As the error process performed in this case, for example, the job executing apparatus determining unit 13 may report that no executing apparatus candidate has been found (or no apparatus information has been received).

Also, the job executing apparatus determining unit 13 selects another job executing terminal determining condition with the next highest priority level (step S32) and performs step S33 and the subsequent steps when all the executing apparatus candidates are currently printing (YES in step S35), when no executing apparatus candidate supports duplex printing (NO in step S37), or when no executing apparatus candidate supports printing on backside-printed paper (NO in step S38). Thus, the information processing apparatus 100 of the second embodiment repeats the determination process using different job executing apparatus determining conditions in descending order of their priority levels until an executing apparatus candidate having apparatus information that meets one of the job executing apparatus determining conditions is found.

As described above, the job control system 1 of the second embodiment makes it possible to dynamically determine an executing apparatus suitable to execute a requested job based on plural job executing apparatus determining conditions and to execute the requested job at the determined executing apparatus. In other words, the job control system 1 can provide a convenient and efficient job control service.

The job control function of the above embodiments may be implemented by executing programs by processing units (e.g., CPUs) of apparatuses (i.e., the information processing apparatus 100, the information terminal 200, and the electronic apparatus 300) constituting the job control system 1. The programs may be written in a programming language(s) supported by the operating environments (platforms) of the apparatuses.

The programs may be stored in a non-transitory computer-readable storage medium (e.g., the storage medium 103a) such as a floppy (flexible) disk (FD), a compact disk (CD), a digital versatile disk (DVD), a secure digital (SD) memory card, or a universal serial bus (USB) memory. For example, the programs stored in the storage medium 103a may be installed in the information processing apparatus 100 via the external I/F 103. Alternatively, the programs may be downloaded and installed via a telecommunication line and the communication I/F 107 into the information processing apparatus 100.

Third Embodiment

In the above embodiments, a data conversion function (i.e., the data conversion unit 14) is included in the information processing apparatus 100. However, the data conversion function may be included in a separate apparatus. For example, system and functional configurations as illustrated in FIGS. 15 and 16 may be employed.

Figure 15:
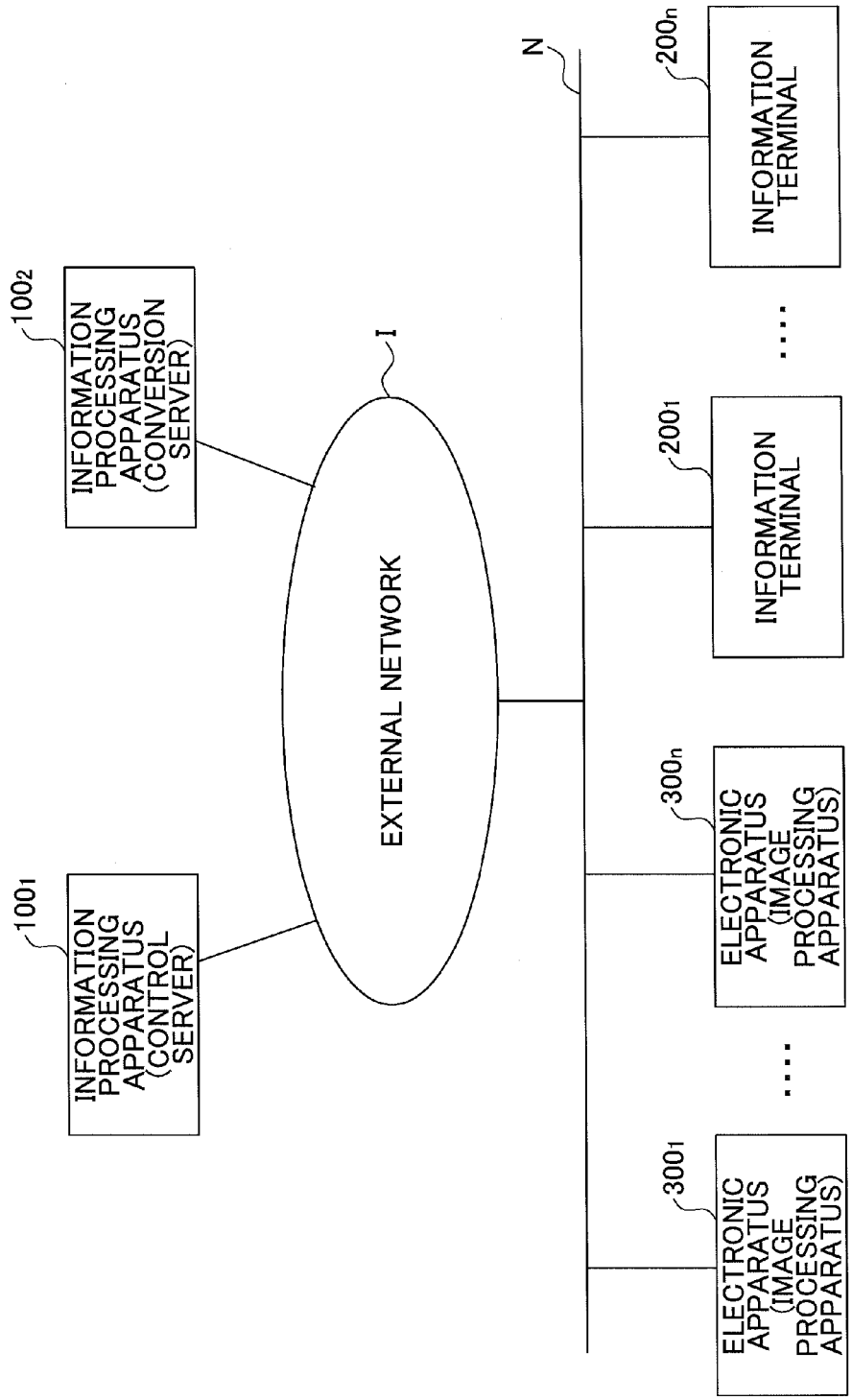
FIG. 15 is a drawing illustrating an exemplary configuration of a job control system according to a third embodiment.

FIG. 15 is a drawing illustrating an exemplary configuration of a job control system 1 according to a third embodiment.

The job control system 1 of FIG. 15 includes an information processing apparatus $100_1$ that is a control server including a job control function for determining an executing electronic apparatus 300 for executing a requested job and an information processing apparatus $100_2$ that is a conversion server including a data conversion function for converting requested job data into data that the executing electronic apparatus 300 can process. The information processing apparatus $100_1$ and the information processing apparatus $100_2$ are connected to the external network I.

Figure 16:
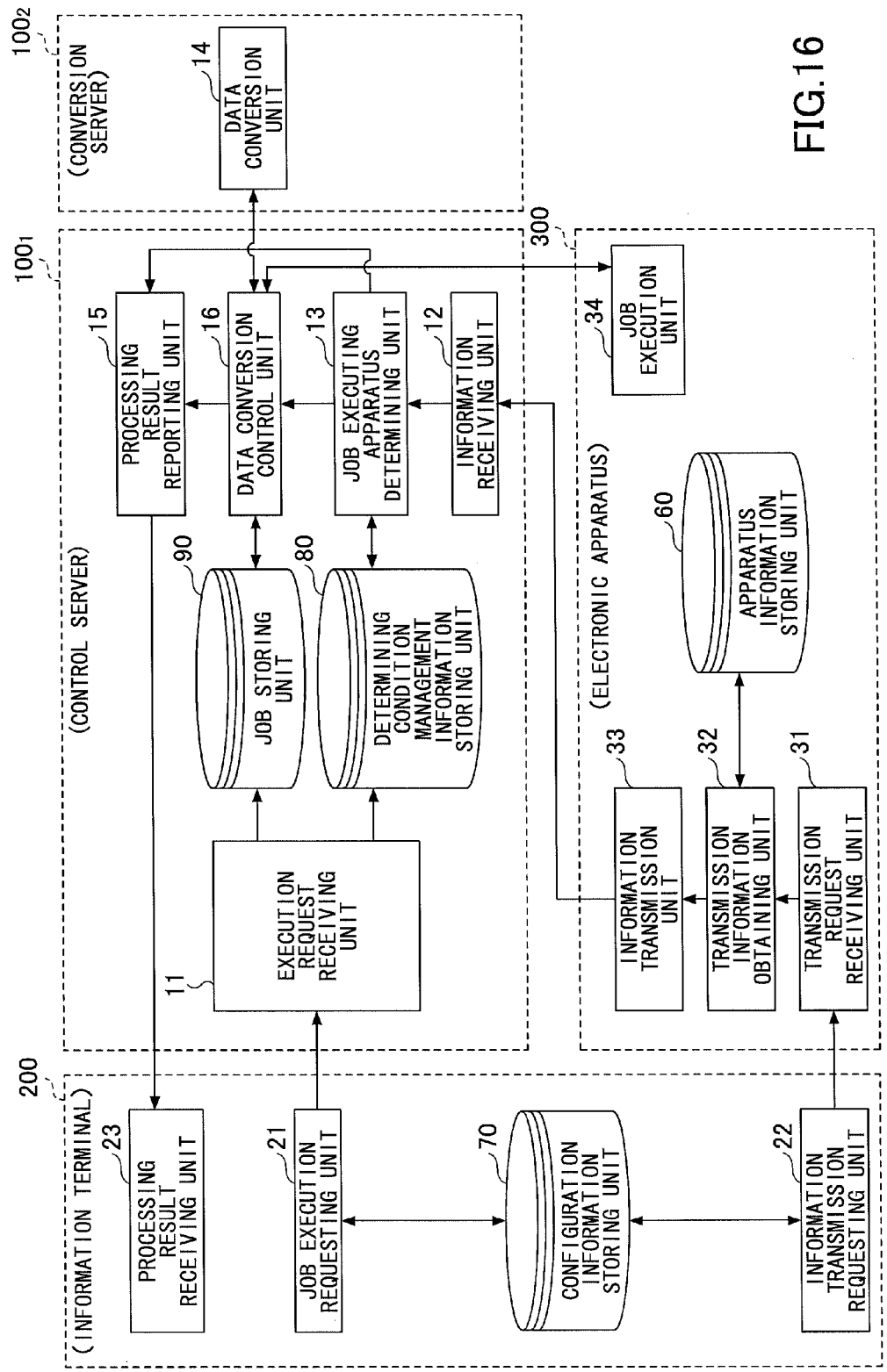
FIG. 16 is a block diagram illustrating an exemplary functional configuration of a job control system according to the third embodiment.

FIG. 16 is a block diagram illustrating an exemplary functional configuration of the job control system 1 of the third embodiment.

As illustrated in FIG. 16, the information processing apparatus $100_1$ includes a data conversion control unit 16 and the information processing apparatus $100_2$ includes a data conversion unit 14 that collaborates with the data conversion control unit 16.

The data conversion control unit 16 obtains requested job data from the job storing unit 90 that stores the requested job data received from the information terminal 200. Next, the data conversion control unit 16 transmits the requested job data and apparatus identification information indicating an executing electronic apparatus 300 determined by the job executing apparatus determining unit 13 to the information processing apparatus $100_2$ (the data conversion unit 14) as a data conversion request.

When receiving the data conversion request, the data conversion unit 14 converts the requested job data into data that the executing electronic apparatus 300 can process. After converting the requested job data, the data conversion unit 14 transmits the converted data to the information processing apparatus $100_1$ (the data conversion control unit 16) as a response to the data conversion request.

Then, the data conversion control unit 16 transmits the converted data to the executing electronic apparatus 300 (the job execution unit 34) to request execution of the requested job. More specifically, the data conversion control unit 16 transmits the converted data to the executing electronic apparatus 300 via a communication connection established when apparatus information is transmitted from the executing electronic apparatus 300 to the information processing apparatus $100_1$.

Thus, the job control system 1 of the third embodiment can provide a job control service with advantageous effects similar to those provided by the job control system 1 of the above embodiments by using a data conversion function of an existing apparatus.

An aspect of this disclosure provides an information processing apparatus connected via a data communication line to electronic apparatuses and an information terminal. The information processing apparatus includes a job executing apparatus determining unit configured to perform a determination process based on apparatus information received from the electronic apparatuses to determine one of the electronic apparatuses as an executing electronic apparatus for executing a requested job, and a data conversion unit configured to convert requested job data received from the information terminal into converted data that the executing electronic apparatus can process and transmit the converted data to the executing electronic apparatus to request execution of the requested job.

An aspect of this disclosure provides a non-transitory computer-readable storage medium storing program code for causing a computer to function as an information processing apparatus connected via a data communication line to electronic apparatuses and an information terminal. The information processing apparatus includes a job executing apparatus determining unit configured to perform a determination process based on apparatus information received from the electronic apparatuses to determine one of the electronic apparatuses as an executing electronic apparatus for executing a requested job, and a data conversion unit configured to convert requested job data received from the information terminal into converted data that the executing electronic apparatus can process and transmit the converted data to the executing electronic apparatus to request execution of the requested job.

A job control system and a job control method according to preferred embodiments of the present invention are described above. However, the present invention is not limited to the specifically disclosed embodiments, and variations and modifications may be made without departing from the scope of the present invention. The present invention may also be applied to an information processing apparatus and a computer-readable storage medium storing a job control program.

What is claimed is:

1. A system, comprising:
   electronic apparatuses;
   an information terminal; and
   an information processing apparatus connected via a data communication line to the electronic apparatuses and the information terminal,
   wherein the information terminal includes
      a job execution requesting unit configured to transmit requested job data of a requested job to the information processing apparatus to request execution of the requested job, and
      an information transmission requesting unit configured to request the electronic apparatuses to transmit apparatus information thereof to the information processing apparatus;
   wherein the information processing apparatus includes
      a job executing apparatus determining unit configured to perform a determination process based on the apparatus information received from the electronic apparatuses to determine one of the electronic apparatuses as an executing electronic apparatus for executing the requested job, and
      a data conversion unit configured to convert the requested job data received from the information terminal into converted data that the executing electronic apparatus can process and transmit the converted data to the executing electronic apparatus to request execution of the requested job; and wherein each of the electronic apparatuses includes
an information transmission unit configured to transmit the apparatus information to the information processing apparatus when requested by the information terminal, and
a job execution unit configured to process the converted data received from the information processing apparatus and thereby execute the requested job when requested by the information processing apparatus.

2. The system as claimed in claim 1, wherein
the information processing apparatus further includes a storing unit configured to store a job executing apparatus determining condition for the requested job; and
the job executing apparatus determining unit is configured to
refer to the storing unit to identify the job executing apparatus determining condition corresponding to the requested job, and
perform the determination process based on the job executing apparatus determining condition and the apparatus information to determine one of the electronic apparatuses whose apparatus information meets the job executing apparatus determining condition as the executing electronic apparatus.

3. The system as claimed in claim 2, wherein
when the requested job is a print job, the job executing apparatus determining unit is configured to determine one of the electronic apparatuses that is capable of processing the print job at a fastest speed as the executing electronic apparatus based on status information in the apparatus information.

4. The system as claimed in claim 2, wherein
when the requested job is a print job, the job executing apparatus determining unit is configured to determine one of the electronic apparatuses that is capable of processing the print job at a lowest cost as the executing electronic apparatus based on configuration information in the apparatus information.

5. The system as claimed in claim 2, wherein
when the requested job is a print job, the job executing apparatus determining unit is configured to determine one of the electronic apparatuses that contains a largest amount of remaining toner among the electronic apparatuses capable of processing the print job as the executing electronic apparatus based on status information in the apparatus information.

6. The system as claimed in claim 2, wherein
when plural job executing apparatus determining conditions are stored for the requested job in the storing unit, the job executing apparatus determining unit is configured to
select one of the job executing apparatus determining conditions based on priority levels assigned to the job executing apparatus determining conditions, and
perform the determining process based on the selected job executing apparatus determining condition and the apparatus information.

7. The system as claimed in claim 1, wherein
the job execution requesting unit is configured to transmit a job executing apparatus determining condition used for the determination process together with the requested job data to the information processing apparatus; and the information transmission requesting unit is configured to transmit decision parameters associated with the job executing apparatus determining condition to the electronic apparatuses to request the electronic apparatuses to transmit the apparatus information corresponding to the decision parameters to the information processing apparatus.

8. The system as claimed in claim 1, wherein the data conversion unit is configured to transmit the converted data to the executing electronic apparatus via a communication connection established between the executing electronic apparatus and the information processing apparatus for transmission and reception of the apparatus information.

9. A method for a job control system including electronic apparatuses, an information terminal, and an information processing apparatus connected via a data communication line to the electronic apparatuses and the information terminal, the method comprising:
transmitting, by the information terminal, requested job data of a requested job to the information processing apparatus to request execution of the requested job;
requesting the electronic apparatuses, by the information terminal, to transmit apparatus information thereof to the information processing apparatus;
performing, by the information processing apparatus, a determination process based on the apparatus information received from the electronic apparatuses to determine one of the electronic apparatuses as an executing electronic apparatus for executing the requested job;
converting, by the information processing apparatus, the requested job data received from the information terminal into converted data that the executing electronic apparatus can process;
transmitting, by the information processing apparatus, the converted data to the executing electronic apparatus to request execution of the requested job;
transmitting, by the electronic apparatuses, the apparatus information to the information processing apparatus when requested by the information terminal; and
processing, at the executing electronic apparatus, the converted data received from the information processing apparatus and thereby executing the requested job when requested by the information processing apparatus.

10. The method as claimed in claim 9, further comprising:
storing, by the information processing apparatus, a job executing apparatus determining condition for the requested job in a storing unit of the information processing apparatus; and
referring, by the information processing apparatus, to the storing unit to identify the job executing apparatus determining condition corresponding to the requested job,
wherein in the determination process, one of the electronic apparatuses whose apparatus information meets the job executing apparatus determining condition is determined as the executing electronic apparatus.

11. The method as claimed in claim 10, wherein
when the requested job is a print job, one of the electronic apparatuses that is capable of processing the print job at a fastest speed is determined as the executing electronic apparatus based on status information in the apparatus information.

12. The method as claimed in claim 10, wherein
when the requested job is a print job, one of the electronic apparatuses that is capable of processing the print job at a lowest cost is determined as the executing electronic apparatus based on configuration information in the apparatus information.

13. The method as claimed in claim 10, wherein
when the requested job is a print job, one of the electronic apparatuses that contains a largest amount of remaining toner among the electronic apparatuses capable of processing the print job is determined as the executing electronic apparatus based on status information in the apparatus information.

14. The method as claimed in claim 10, wherein
when plural job executing apparatus determining conditions are stored for the requested job in the storing unit,
one of the job executing apparatus determining conditions is selected based on priority levels assigned to the job executing apparatus determining conditions, and
the determining process is performed based on the selected job executing apparatus determining condition and the apparatus information.

15. The method as claimed in claim 9, further comprising:
transmitting, by the information terminal, a job executing apparatus determining condition used for the determination process together with the requested job data to the information processing apparatus; and
transmitting, by the information terminal, decision parameters associated with the job executing apparatus determining condition to the electronic apparatuses to request the electronic apparatuses to transmit the apparatus information corresponding to the decision parameters to the information processing apparatus.

16. The method as claimed in claim 9, wherein the converted data is transmitted to the executing electronic apparatus via a communication connection established between the executing electronic apparatus and the information processing apparatus for transmission and reception of the apparatus information.

* * * * *